US012770356B2

(12) United States Patent
Galeotti et al.

(10) Patent No.: US 12,770,356 B2
(45) Date of Patent: Oct. 20, 2026

(54) SYSTEM AND METHOD FOR DIRECT DIAGNOSTIC AND PROGNOSTIC SEMANTIC SEGMENTATION OF IMAGES

(71) Applicant: Carnegie Mellon University, Pittsburgh, PA (US)

(72) Inventors: John Michael Galeotti, Pittsburgh, PA (US); Gautam Rajendrakumar Gare, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 222 days.

(21) Appl. No.: 18/284,179

(22) PCT Filed: Mar. 28, 2022

(86) PCT No.: PCT/US2022/022177

§ 371 (c)(1),
(2) Date: Sep. 26, 2023

(87) PCT Pub. No.: WO2022/204591

PCT Pub. Date: Sep. 29, 2022

(65) Prior Publication Data

US 2024/0177445 A1 May 30, 2024

Related U.S. Application Data

(60) Provisional application No. 63/166,363, filed on Mar. 26, 2021.

(51) Int. Cl.
*G06V 10/26* (2022.01)
*G06T 7/00* (2017.01)
(Continued)

(52) U.S. Cl.
CPC ............ *G06V 10/26* (2022.01); *G06T 7/0012* (2013.01); *G06T 7/11* (2017.01); *G06V 10/764* (2022.01);
(Continued)

(58) Field of Classification Search
CPC ........ G06V 10/26; G06V 20/70; G06V 10/82; G06V 10/764; G06T 7/11; G06T 7/0012
See application file for complete search history.

(56) References Cited

U.S. PATENT DOCUMENTS

2019/0237186 A1* 8/2019 El-Baz .................. G16H 30/40
2020/0258234 A1* 8/2020 Wu ........................ G16H 30/20
(Continued)

FOREIGN PATENT DOCUMENTS

WO 2020252256 A1 12/2020

*Primary Examiner* — Mohammed H Zuberi
(74) *Attorney, Agent, or Firm* — The Webb Law Firm

(57) ABSTRACT

Provided are methods including the steps of receiving, with at least one computing device, an image of a portion of a subject, assigning: with the at least one computing device and based on a machine-learning model, a label to one or more pixels of the image to generate a diagnostically segmented image: and classifying, with the at least one computing device and based on a machine-learning model, the diagnostically segmented image and the one or more pixels into at least one class to generate a classified image, wherein the classified image includes a classification label indicating a clinical assessment of the portion of the subject and wherein the one or more pixels include a clinical label indicating a diagnosis of a portion of a subject contained within each pixel, based on the diagnostically segmented image having labels assigned to each pixel of the segmented image.

20 Claims, 7 Drawing Sheets

(51) Int. Cl.

| | |
|---|---|
| ***G06T 7/11*** | (2017.01) |
| ***G06V 10/764*** | (2022.01) |
| ***G06V 10/82*** | (2022.01) |
| ***G06V 20/70*** | (2022.01) |

(52) U.S. Cl.

CPC .............. *G06V 10/82* (2022.01); *G06V 20/70* (2022.01); *G06T 2207/10132* (2013.01); *G06T 2207/20081* (2013.01); *G06T 2207/20084* (2013.01); *G06T 2207/30061* (2013.01); *G06V 2201/031* (2022.01)

(56) References Cited

U.S. PATENT DOCUMENTS

| | | | | |
|---|---|---|---|---|
| 2020/0278408 | A1* | 9/2020 | Sung | G06V 10/764 |
| 2020/0410672 | A1 | 12/2020 | Katscher et al. | |
| 2021/0090694 | A1 | 3/2021 | Colley et al. | |
| 2022/0207720 | A1* | 6/2022 | Kim | G06T 7/0012 |
| 2022/0208355 | A1* | 6/2022 | Li | G06T 7/174 |
| 2022/0245800 | A1* | 8/2022 | Champagne | G06T 3/40 |
| 2023/0097895 | A1* | 3/2023 | Lou | G06T 7/11 382/131 |

* cited by examiner

SYSTEM AND METHOD FOR DIRECT DIAGNOSTIC AND PROGNOSTIC SEMANTIC SEGMENTATION OF IMAGES

CROSS REFERENCE TO RELATED APPLICATION

This application is the United States national phase of International Application No. PCT/US22/22127, filed Mar. 28, 2022, and claims priority to U.S. Provisional Patent Application No. 63/166,363, filed Mar. 26, 2021, the disclosures of which are hereby incorporated herein by reference in their entireties.

GOVERNMENT LICENSE RIGHTS

This invention was made with Government support under W81XWH-19-C-0083 awarded by U.S. Army Medical Research Activity. The Government has certain rights in the invention.

BACKGROUND

1. Field

This disclosure relates generally to direct diagnostic and prognostic semantic segmentation and, in non-limiting embodiments, to systems and methods for direct diagnostic and prognostic semantic segmentation of images.

2. Technical Considerations

Ultrasound has become increasingly popular, surpassing other medical imaging methods to become a frequently utilized medical imaging modality. There are no known side effects of diagnostic ultrasound imaging, and it may be generally less expensive compared to many other diagnostic imaging modalities such as CT or MRI scans (e.g., a series of images generated by a computing device using techniques such as X-ray imaging and/or magnetic fields and radio waves). For example, ultrasound may be relatively low risk (e.g., relatively few potential side-effects and/or the like), portable, radiation free, relatively inexpensive (e.g., compared to other types of medical image), and/or the like. Consequently, ultrasound implementation for diagnosis, interventions, and therapy has increased, and in recent years the quality of data gathered from ultrasound systems has undergone refinement.

The increased quality of ultrasound images has enabled improved machine-learning and/or computer vision ultrasound algorithms, including learning-based methods such as current deep-network approaches. In spite of the improved image quality, it may still be challenging for experts (with extensive anatomic knowledge) to draw precise boundaries between tissue interfaces in ultrasound images, especially when adjacent tissues have similar acousto-mechanical properties.

Some techniques may extract features from a grey ultrasound image. Those features may be used for classification using machine-learning architectures such as, but not limited to, support vector machine (SVM), random forests, or as part of convolutional neural networks (CNN) or deep neural networks (DNN). Some of the recent algorithms may differentiate tissues based on visible boundaries. The performance of these algorithms may be dependent on the quality of the ultrasound image.

Ultrasound inherently acquires radio frequency (RF) acoustic waveform data, but in conventional practice an ultrasound machine may use envelope detection to discard a lot of information to produce human-interpretable, amplitude-only greyscale image pixels. RF data may be compared to the use of raw images to preserve detailed information in digital photography, but in contrast to raw photos, ultrasound RF data may also contain additional types of information that are not available in a normal greyscale image (e.g., frequency and phase information). When RF data is available, it may be directly analyzed to determine the dominant frequencies reflected and/or scattered from each region of the image based on the imaging device. The analysis of the raw RF data may allow algorithms to differentiate tissues based on their acoustic frequency signatures rather than visible boundaries alone.

Medical diagnoses, prognoses, and other clinical assessments of medical images may benefit from an improved understanding of the anatomical structure, potentially expanding applications such as detecting cancerous cells, malformations, and/or the like. Ultrasound image frames (or other image frames) may be classified with a diagnostic label for the whole image using segmentation and classification techniques. Whole-image classification may not provide accurate results and may result in false positive results. A holistic analysis of a medical image and individual pixels may help eliminate false positives, which is a common issue encountered in CNN based segmentation techniques. The use of raw RF waveform data may enhance the analysis of individual pixels by capturing innate tissue characteristics.

CNN based semantic segmentation using medical images may be an effective tool for delineating important tissue structures and assisting in improving diagnosis, prognosis, or clinical assessment based on a segmented image. Diagnostic usage of semantic segmentation may only use class labels that are diagnostically directly relevant, which may lead to the grouping of the diagnostically less relevant and irrelevant tissues into a common background class. In comparison, labeling of tissue classes may not be restricted to the most diagnostically relevant classes; neural networks which are prone to false positive detection may benefit from such labeling.

SUMMARY

According to non-limiting embodiments or aspects, provided is a method comprising: receiving, with at least one computing device, an image of a portion of a subject; assigning, with the at least one computing device and based on a segmentation machine-learning model, a label to each pixel of the image to generate a segmented image; and classifying, with the at least one computing device and based on a classification machine-learning model, the segmented image into at least one class to generate a classified image, the classified image comprises a classification label indicating a clinical assessment of the portion of the subject, based on the segmented image having labels assigned to each pixel of the segmented image.

In non-limiting embodiments or aspects, the method further comprises: generating the classification machine-learning model by training the classification machine-learning model using the segmented image as input, the classification machine-learning model comprises pre-trained weights of the segmentation machine-learning model.

In non-limiting embodiments or aspects, the method further comprises: classifying the segmented image into at least one class based on a probability score, the probability score indicates a likelihood that the segmented image contains an image of the portion of the subject belonging to the at least one class, the probability score based on a ratio of an average probability of the segmented image across the at least one class to a sum of average probabilities of the segmented image across each diagnostic class of a total of diagnostic classes, given by:

$$CSL(k, I_s) = \frac{\exp(CSS(k, I_s))}{\sum_{m \in A} \exp(CSS(m, I_s))},$$

the average probability of the segmented image across the at least one class is based on a ratio of a sum of average probabilities of each pixel of a total number of pixels across each diagnostic class of the total of diagnostic classes to the total number of pixels, given by:

$$CSS(m, I_s) = \frac{\sum_{p=1}^{n} I_s(m, p)}{n};$$

and assigning a classification label indicating a diagnosis of the portion of the subject to the segmented image to generate a classified image, the classification label is assigned to the segmented image based on the probability score.

In non-limiting embodiments or aspects, the clinical label comprises a diagnostic label, the diagnostic label comprises: a label associated with a benign lesion, a label associated with a malignant lesion, a label associated with background, or any combination thereof.

In non-limiting embodiments or aspects, the probability score indicates a likelihood that the segmented image contains an image of the portion of the subject belonging to the malignant lesion class, the probability score based on a ratio of an average probability of the segmented image across the malignant lesion class to a sum of the average probability of the segmented image across the malignant lesion class and an average probability of the segmented image across the benign lesion class, given by:

$$P_m(I_s) = \frac{\exp(M(I_s))}{\exp(M(I_s)) + \exp(B(I_s))}.$$

In non-limiting embodiments or aspects, the at least one machine-learning model comprises a W-Net architecture, an AW-Net architecture, or any combination thereof.

In non-limiting embodiments or aspects, the classification labels comprise: a label associated with a malignant lesion, a label associated with a benign lesion, or any combination thereof.

In non-limiting embodiments or aspects, the image comprises a grey ultrasound image.

In non-limiting embodiments or aspects, the image comprises a radio frequency (RF) ultrasound image.

In non-limiting embodiments or aspects, the image comprises at least one radio frequency (RF) ultrasound image and at least one grey ultrasound image.

In non-limiting embodiments or aspects, the portion of the subject is subcutaneous tissue.

In non-limiting embodiments or aspects, the portion of the subject is a breast lesion.

In non-limiting embodiments or aspects, the image is a sequence of images captured over time.

According to non-limiting embodiments or aspects, provided is a system comprising at least one computing device programmed or configured to: receive an image of a portion of a subject; assign, based on a segmentation machine-learning model, a label to each pixel of the image to generate a segmented image; and classify, based on a classification machine-learning model, the segmented image into at least one class to generate a classified image, the classified image comprises a classification label indicating a clinical assessment of the portion of the subject, based on the segmented image having labels assigned to each pixel of the segmented image.

In non-limiting embodiments or aspects, the label comprises: a label associated with A-line, a label associated with B-line, a label associated with healthy pleural line, a label associated with unhealthy pleural line, a label associated with healthy region, a label associated with unhealthy region, a label associated with background, or any combination thereof.

In non-limiting embodiments or aspects, the classification label comprises: a label associated with COVID-19, a label associated with pneumonia, a label associated with normal, a label associated with a pulmonary disease, or any combination thereof.

In non-limiting embodiments or aspects, the image comprises a grey ultrasound image.

In non-limiting embodiments or aspects, the image comprises a radio frequency (RF) ultrasound image.

In non-limiting embodiments or aspects, the portion of the subject is a lung region.

In non-limiting embodiments or aspects, the at least one computing device further programmed or configured to: generate the classification machine-learning model by training the classification machine-learning model using the segmented image as input, the classification machine-learning model comprises pre-trained weights of the segmentation machine-learning model.

In non-limiting embodiments or aspects, the image is a sequence of images captured over time.

In non-limiting embodiments or aspects, wherein each pixel of the segmented image is labeled with one or more labels, the labels comprising: one or more labels associated with anatomic tissue type, one or more labels associated with diagnostic artifact type, one or more labels associated with a visual descriptor, or any combination thereof.

In non-limiting embodiments or aspects, the image comprises at least one radio frequency (RF) ultrasound image and at least one grey ultrasound image.

In non-limiting embodiments or aspects, the label assigned to each pixel of the image to generate the segmented image is a tissue-type label, the tissue-type label comprises: a label associated with skin, a label associated with fat, a label associated with fat fascia, a label associated with muscle, a label associated with muscle fascia, a label associated with bone, a label associated with vessels, a label associated with nerves, a label associated with lymphatic structures, a label associated with tumors, or any combination thereof.

In non-limiting embodiments or aspects, the segmentation machine-learning model comprises a W-Net architecture, an AW-Net architecture, or any combination thereof.

In non-limiting embodiments or aspects, the classification machine-learning model comprises a W-Net architecture, an AW-Net architecture, or any combination thereof.

According to non-limiting embodiments or aspects, provided is a system comprising at least one computing device programmed or configured to: receive an image of a portion of a subject; assign, based on at least one machine-learning model, diagnostic labels to one or more pixels of the image to generate a diagnostically segmented image; and classify, based on the at least one machine-learning model, the diagnostically segmented image into at least one class to generate a classified image, the classified image comprises a classification label indicating a diagnosis of the portion of the subject, based on the diagnostically segmented image having diagnostic labels assigned to the one or more pixels of the segmented image.

In non-limiting embodiments or aspects, wherein classifying the segmented image into at least one class comprises: determining a probability score, the probability score indicates a likelihood that the segmented image contains an image of the portion of the subject belonging to the at least one class, the probability score based on a ratio of an average probability of the segmented image across the at least one class to a sum of average probabilities of the segmented image across each diagnostic class of a total of diagnostic classes, given by:

$$CSL(k, I_s) = \frac{\exp(CSS(k, I_s))}{\sum_{m\in A}\exp(CSS(m, I_s))},$$

the average probability of the segmented image across the at least one class is based on a ratio of a sum of average probabilities of the one or more pixels of a total number of pixels in the segmented image across each diagnostic class of the total of diagnostic classes to the total number of pixels, given by:

$$CSS(m, I_s) = \frac{\sum_{p=1}^{n} I_s(m, p)}{n};$$

and assigning the classification label indicating a diagnosis of the portion of the subject to the segmented image to generate the classified image, the classification label is assigned to the segmented image based on the probability score.

In non-limiting embodiments or aspects, the probability score indicates a likelihood that the segmented image contains an image of the portion of the subject belonging to the malignant lesion class, the probability score based on a ratio of an average probability of the segmented image across the malignant lesion class to a sum of the average probability of the segmented image across the malignant lesion class and an average probability of the segmented image across the benign lesion class, given by:

$$P_m(I_s) = \frac{\exp(M(I_s))}{\exp(M(I_s)) + \exp(B(I_s))}.$$

In non-limiting embodiments or aspects, the diagnostic labels comprise: a label associated with a benign lesion, a label associated with a malignant lesion, a label associated with background, or any combination thereof.

In non-limiting embodiments or aspects, the classification labels comprise: a label associated with a malignant lesion, a label associated with a benign lesion, or any combination thereof.

In non-limiting embodiments or aspects, the at least one machine-learning model comprises a W-Net architecture, an AW-Net architecture, or any combination thereof.

In non-limiting embodiments or aspects, the image comprises a grey ultrasound image.

In non-limiting embodiments or aspects, the image comprises a radio frequency (RF) ultrasound image.

In non-limiting embodiments or aspects, the image comprises at least one radio frequency (RF) ultrasound image and at least one grey ultrasound image.

In non-limiting embodiments or aspects, the portion of the subject is subcutaneous tissue.

In non-limiting embodiments or aspects, the portion of the subject is a breast lesion.

In non-limiting embodiments or aspects, the image is a sequence of images captured over time.

According to non-limiting embodiments or aspects, provided is a system comprising at least one computing device programmed or configured to: receive an image of a portion of a subject; assign, based on at least one machine-learning model, a label to one or more pixels of the image to generate a segmented image; and classify, based on the at least one machine-learning model, the one or more pixels into at least one class to generate a diagnostic segmented image, the one or more pixels comprise a clinical label indicating a diagnosis of a portion of a subject contained within each pixel of the one or more pixels, based on the label assigned to the one or more pixels.

In non-limiting embodiments or aspects, the at least one computing device further programmed or configured to: classify the segmented image into at least one class based on a probability score, the probability score indicates a likelihood that the segmented image contains an image of the portion of the subject belonging to the at least one class, the probability score based on a ratio of an average probability of the segmented image across the at least one class to a sum of average probabilities of the segmented image across each diagnostic class of a total of diagnostic classes, given by:

$$CSL(k, I_s) = \frac{\exp(CSS(k, I_s))}{\sum_{m\in A}\exp(CSS(m, I_s))},$$

the average probability of the segmented image across the at least one class is based on a ratio of a sum of average probabilities of each pixel of a total number of pixels across each diagnostic class of the total of diagnostic classes to the total number of pixels, given by:

$$CSS(m, I_s) = \frac{\sum_{p=1}^{n} I_s(m, p)}{n};$$

and assign a classification label indicating a diagnosis of the portion of the subject to the segmented image to generate a classified image, the classification label is assigned to the segmented image based on the probability score.

In non-limiting embodiments or aspects, the clinical label comprises a diagnostic label, the diagnostic label comprises: a label associated with a benign lesion, a label associated with a malignant lesion, a label associated with background, or any combination thereof.

In non-limiting embodiments or aspects, the at least one computing device further programmed or configured to classify the segmented image into a benign lesion class or a malignant lesion class based on a probability score, the probability score indicates a likelihood that the segmented image contains an image of the portion of the subject belonging to the malignant lesion class, the probability score based on a ratio of an average probability of the segmented image across the malignant lesion class to a sum of the average probability of the segmented image across the malignant lesion class and an average probability of the segmented image across the benign lesion class, given by:

$$P_m(I_s) = \frac{\exp(M(I_s))}{\exp(M(I_s)) + \exp(B(I_s))}.$$

In non-limiting embodiments or aspects, the at least one machine-learning model comprises a W-Net architecture, an AW-Net architecture, or any combination thereof.

In non-limiting embodiments or aspects, the classification labels comprise: a label associated with a malignant lesion, a label associated with a benign lesion, or any combination thereof.

In non-limiting embodiments or aspects, the image comprises a grey ultrasound image.

In non-limiting embodiments or aspects, the image comprises a radio frequency (RF) ultrasound image.

In non-limiting embodiments or aspects, the image comprises at least one radio frequency (RF) ultrasound image and at least one grey ultrasound image.

In non-limiting embodiments or aspects, the portion of the subject is subcutaneous tissue.

In non-limiting embodiments or aspects, the portion of the subject is a breast lesion.

In non-limiting embodiments or aspects, the image is a sequence of images captured over time.

According to non-limiting embodiments or aspects, provided is a computer program product comprising at least one non-transitory computer-readable medium including instructions that, when executed by at least one computing device, cause the at least one computing device to: receive an image of a portion of a subject; assign, based on a segmentation machine-learning model, a label to each pixel of the image to generate a segmented image; and classify, based on a classification machine-learning model, the segmented image into at least one class to generate a classified image, the classified image comprises a classification label indicating a clinical assessment of the portion of the subject, based on the segmented image having labels assigned to each pixel of the segmented image.

In non-limiting embodiments or aspects, the label comprises: a label associated with A-line, a label associated with B-line, a label associated with healthy pleural line, a label associated with unhealthy pleural line, a label associated with healthy region, a label associated with unhealthy region, a label associated with background, or any combination thereof.

In non-limiting embodiments or aspects, the classification label comprises: a label associated with COVID-19, a label associated with pneumonia, a label associated with normal, a label associated with a pulmonary disease, or any combination thereof.

In non-limiting embodiments or aspects, the image comprises a grey ultrasound image.

In non-limiting embodiments or aspects, the image comprises a radio frequency (RF) ultrasound image.

In non-limiting embodiments or aspects, the portion of the subject is a lung region.

In non-limiting embodiments or aspects, the program instructions further cause the at least one computing device to: generate the classification machine-learning model by training the classification machine-learning model using the segmented image as input, the classification machine-learning model comprises pre-trained weights of the segmentation machine-learning model.

In non-limiting embodiments or aspects, the image is a sequence of images captured over time.

In non-limiting embodiments or aspects, wherein each pixel of the segmented image is labeled with one or more labels, the labels comprising: one or more labels associated with anatomic tissue type, one or more labels associated with diagnostic artifact type, one or more labels associated with a visual descriptor, or any combination thereof.

In non-limiting embodiments or aspects, the image comprises at least one radio frequency (RF) ultrasound image and at least one grey ultrasound image.

In non-limiting embodiments or aspects, the label assigned to each pixel of the image to generate the segmented image is a tissue-type label, the tissue-type label comprises: a label associated with skin, a label associated with fat, a label associated with fat fascia, a label associated with muscle, a label associated with muscle fascia, a label associated with bone, a label associated with vessels, a label associated with nerves, a label associated with lymphatic structures, a label associated with tumors, or any combination thereof.

In non-limiting embodiments or aspects, the segmentation machine-learning model comprises a W-Net architecture, an AW-Net architecture, or any combination thereof.

In non-limiting embodiments or aspects, the classification machine-learning model comprises a W-Net architecture, an AW-Net architecture, or any combination thereof.

According to non-limiting embodiments or aspects, provided is a computer program product comprising at least one non-transitory computer-readable medium including instructions that, when executed by at least one computing device, cause the at least one computing device to: receive an image of a portion of a subject; assign, based on at least one machine-learning model, diagnostic labels to one or more pixels of the image to generate a diagnostically segmented image; and classify, based on the at least one machine-learning model, the diagnostically segmented image into at least one class to generate a classified image, the classified image comprises a classification label indicating a diagnosis of the portion of the subject, based on the diagnostically segmented image having diagnostic labels assigned to the one or more pixels of the segmented image.

In non-limiting embodiments or aspects, wherein classifying the segmented image into at least one class comprises: determining a probability score, the probability score indicates a likelihood that the segmented image contains an image of the portion of the subject belonging to the at least one class, the probability score based on a ratio of an average probability of the segmented image across the at least one class to a sum of average probabilities of the segmented image across each diagnostic class of a total of diagnostic classes, given by:

$$CSL(k, I_s) = \frac{\exp(CSS(k, I_s))}{\sum_{m \in A} \exp(CSS(m, I_s))},$$

the average probability of the segmented image across the at least one class is based on a ratio of a sum of average probabilities of the one or more pixels of a total number of pixels in the segmented image across each diagnostic class of the total of diagnostic classes to the total number of pixels, given by:

$$CSS(m, I_s) = \frac{\sum_{p=1}^{n} I_s(m, p)}{n};$$

and assigning the classification label indicating a diagnosis of the portion of the subject to the segmented image to generate the classified image, the classification label is assigned to the segmented image based on the probability score.

In non-limiting embodiments or aspects, the probability score indicates a likelihood that the segmented image contains an image of the portion of the subject belonging to the malignant lesion class, the probability score based on a ratio of an average probability of the segmented image across the malignant lesion class to a sum of the average probability of the segmented image across the malignant lesion class and an average probability of the segmented image across the benign lesion class, given by:

$$P_m(I_s) = \frac{\exp(M(I_s))}{\exp(M(I_s)) + \exp(B(I_s))}.$$

In non-limiting embodiments or aspects, the diagnostic labels comprise: a label associated with a benign lesion, a label associated with a malignant lesion, a label associated with background, or any combination thereof.

In non-limiting embodiments or aspects, the classification labels comprise: a label associated with a malignant lesion, a label associated with a benign lesion, or any combination thereof.

In non-limiting embodiments or aspects, the at least one machine-learning model comprises a W-Net architecture, an AW-Net architecture, or any combination thereof.

In non-limiting embodiments or aspects, the image comprises a grey ultrasound image.

In non-limiting embodiments or aspects, the image comprises a radio frequency (RF) ultrasound image.

In non-limiting embodiments or aspects, the image comprises at least one radio frequency (RF) ultrasound image and at least one grey ultrasound image.

In non-limiting embodiments or aspects, the portion of the subject is subcutaneous tissue.

In non-limiting embodiments or aspects, the portion of the subject is a breast lesion.

In non-limiting embodiments or aspects, the image is a sequence of images captured over time.

According to non-limiting embodiments or aspects, provided is a computer program product comprising at least one non-transitory computer-readable medium including instructions that, when executed by at least one computing device, cause the at least one computing device to: receive an image of a portion of a subject; assign, based on at least one machine-learning model, a label to one or more pixels of the image to generate a segmented image; and classify, based on the at least one machine-learning model, the one or more pixels into at least one class to generate a diagnostic segmented image, the one or more pixels comprise a clinical label indicating a diagnosis of a portion of a subject contained within each pixel of the one or more pixels, based on the label assigned to the one or more pixels.

In non-limiting embodiments or aspects, the program instructions further cause the at least one computing device to: classify the segmented image into at least one class based on a probability score, the probability score indicates a likelihood that the segmented image contains an image of the portion of the subject belonging to the at least one class, the probability score based on a ratio of an average probability of the segmented image across the at least one class to a sum of average probabilities of the segmented image across each diagnostic class of a total of diagnostic classes, given by:

$$CSL(k, I_s) = \frac{\exp(CSS(k, I_s))}{\sum_{m\in A}\exp(CSS(m, I_s))},$$

the average probability of the segmented image across the at least one class is based on a ratio of a sum of average probabilities of each pixel of a total number of pixels across each diagnostic class of the total of diagnostic classes to the total number of pixels, given by:

$$CSS(m, I_s) = \frac{\sum_{p=1}^{n} I_s(m, p)}{n};$$

and assign a classification label indicating a diagnosis of the portion of the subject to the segmented image to generate a classified image, the classification label is assigned to the segmented image based on the probability score.

In non-limiting embodiments or aspects, the clinical label comprises a diagnostic label, the diagnostic label comprises: a label associated with a benign lesion, a label associated with a malignant lesion, a label associated with background, or any combination thereof.

In non-limiting embodiments or aspects, the program instructions further cause the at least one computing device to classify the segmented image into a benign lesion class or a malignant lesion class based on a probability score, the probability score indicates a likelihood that the segmented image contains an image of the portion of the subject belonging to the malignant lesion class, the probability score based on a ratio of an average probability of the segmented image across the malignant lesion class to a sum of the average probability of the segmented image across the malignant lesion class and an average probability of the segmented image across the benign lesion class, given by:

$$P_m(I_s) = \frac{\exp(M(I_s))}{\exp(M(I_s)) + \exp(B(I_s))}.$$

In non-limiting embodiments or aspects, the at least one machine-learning model comprises a W-Net architecture, an AW-Net architecture, or any combination thereof.

In non-limiting embodiments or aspects, the classification labels comprise: a label associated with a malignant lesion, a label associated with a benign lesion, or any combination thereof.

In non-limiting embodiments or aspects, the image comprises a grey ultrasound image.

In non-limiting embodiments or aspects, the image comprises a radio frequency (RF) ultrasound image.

In non-limiting embodiments or aspects, the image comprises at least one radio frequency (RF) ultrasound image and at least one grey ultrasound image.

In non-limiting embodiments or aspects, the portion of the subject is subcutaneous tissue.

In non-limiting embodiments or aspects, the portion of the subject is a breast lesion.

In non-limiting embodiments or aspects, the image is a sequence of images captured over time.

Further embodiments are set forth in the following numbered clauses:

Clause 1: A method comprising: receiving, with at least one computing device, an image of a portion of a subject; assigning, with the at least one computing device and based on a segmentation machine-learning model, a label to each pixel of the image to generate a segmented image; and classifying, with the at least one computing device and based on a classification machine-learning model, the segmented image into at least one class to generate a classified image, wherein the classified image comprises a classification label indicating a clinical assessment of the portion of the subject, based on the segmented image having labels assigned to each pixel of the segmented image.

Clause 2: The method of clause 1, wherein the label comprises: a label associated with A-line, a label associated with B-line, a label associated with healthy pleural line, a label associated with unhealthy pleural line, a label associated with healthy region, a label associated with unhealthy region, a label associated with background, or any combination thereof.

Clause 3: The method of clause 1 or 2, wherein the classification label comprises: a label associated with COVID-19, a label associated with pneumonia, a label associated with normal, a label associated with a pulmonary disease, or any combination thereof.

Clause 4: The method of any of clauses 1-3, wherein the image comprises a grey ultrasound image.

Clause 5: The method of any of clauses 1-4, wherein the image comprises a radio frequency (RF) ultrasound image.

Clause 6: The method of any of clauses 1-5, wherein the portion of the subject is a lung region.

Clause 7: The method of any of clauses 1-6, further comprising: generating the classification machine-learning model by training the classification machine-learning model using the segmented image as input, wherein the classification machine-learning model comprises pre-trained weights of the segmentation machine-learning model.

Clause 8: The method of any of clauses 1-7, wherein the image is a sequence of images captured over time.

Clause 9: The method of any of clauses 1-8, wherein each pixel of the segmented image is labeled with one or more labels, the labels comprising: one or more labels associated with anatomic tissue type, one or more labels associated with diagnostic artifact type, one or more labels associated with a visual descriptor, or any combination thereof.

Clause 10: The method of any of clauses 1-9, wherein the image comprises at least one radio frequency (RF) ultrasound image and at least one grey ultrasound image.

Clause 11: The method of any of clauses 1-10, wherein the label assigned to each pixel of the image to generate the segmented image is a tissue-type label, wherein the tissue-type label comprises: a label associated with skin, a label associated with fat, a label associated with fat fascia, a label associated with muscle, a label associated with muscle fascia, a label associated with bone, a label associated with vessels, a label associated with nerves, a label associated with lymphatic structures, a label associated with tumors, or any combination thereof.

Clause 12: The method of any of clauses 1-11, wherein the segmentation machine-learning model comprises a W-Net architecture, an AW-Net architecture, or any combination thereof.

Clause 13: The method of any of clauses 1-12, wherein the classification machine-learning model comprises a W-Net architecture, an AW-Net architecture, or any combination thereof.

Clause 14: A method comprising: receiving, with at least one computing device, an image of a portion of a subject; assigning, with the at least one computing device and based on at least one machine-learning model, diagnostic labels to one or more pixels of the image to generate a diagnostically segmented image; and classifying, with the at least one computing device and based on the at least one machine-learning model, the diagnostically segmented image into at least one class to generate a classified image, wherein the classified image comprises a classification label indicating a diagnosis of the portion of the subject, based on the diagnostically segmented image having diagnostic labels assigned to the one or more pixels of the segmented image.

Clause 15: The method of clause 14, wherein classifying the segmented image into at least one class comprises: determining a probability score, wherein the probability score indicates a likelihood that the segmented image contains an image of the portion of the subject belonging to the at least one class, the probability score based on a ratio of an average probability of the segmented image across the at least one class to a sum of average probabilities of the segmented image across each diagnostic class of a total of diagnostic classes, given by:

$$CSL(k, I_s) = \frac{\exp(CSS(k, I_s))}{\sum_{m\in A}\exp(CSS(m, I_s))},$$

wherein the average probability of the segmented image across the at least one class is based on a ratio of a sum of average probabilities of the one or more pixels of a total number of pixels in the segmented image across each diagnostic class of the total of diagnostic classes to the total number of pixels, given by:

$$CSS(m, I_s) = \frac{\sum_{p=1}^{n} I_s(m, p)}{n};$$

and assigning the classification label indicating a diagnosis of the portion of the subject to the segmented image to generate the classified image, wherein the classification label is assigned to the segmented image based on the probability score.

Clause 16: The method of clause 14 or 15, wherein the segmented image is classified into a benign lesion class or a malignant lesion class based on a probability score, wherein the probability score indicates a likelihood that the segmented image contains an image of the portion of the subject belonging to the malignant lesion class, the probability score based on a ratio of an average probability of the segmented image across the malignant lesion class to a sum of the average probability of the segmented image across the malignant lesion class and an average probability of the segmented image across the benign lesion class, given by:

$$P_m(I_s) = \frac{\exp(M(I_s))}{\exp(M(I_s)) + \exp(B(I_s))}.$$

Clause 17: The method of any of clauses 14-16, wherein the diagnostic labels comprise: a label associated with a benign lesion, a label associated with a malignant lesion, a label associated with background, or any combination thereof.

Clause 18: The method of any of clauses 14-17, wherein the classification labels comprise: a label associated with a malignant lesion, a label associated with a benign lesion, or any combination thereof.

Clause 19: The method of any of clauses 14-18, wherein the at least one machine-learning model comprises a W-Net architecture, an AW-Net architecture, or any combination thereof.

Clause 20: The method of any of clauses 14-19, wherein the image comprises a grey ultrasound image.

Clause 21: The method of any of clauses 14-20, wherein the image comprises a radio frequency (RF) ultrasound image.

Clause 22: The method of any of clauses 14-21, wherein the image comprises at least one radio frequency (RF) ultrasound image and at least one grey ultrasound image.

Clause 23: The method of any of clauses 14-22, wherein the portion of the subject is subcutaneous tissue.

Clause 24: The method of any of clauses 14-23, wherein the portion of the subject is a breast lesion.

Clause 25: The method of any of clauses 14-24, wherein the image is a sequence of images captured over time.

Clause 26: A method comprising: receiving, with at least one computing device, an image of a portion of a subject; assigning, with the at least one computing device and based on at least one machine-learning model, a label to one or more pixels of the image to generate a segmented image; and classifying, with the at least one computing device and based on the at least one machine-learning model, the one or more pixels into at least one class to generate a diagnostic segmented image, wherein the one or more pixels comprise a clinical label indicating a diagnosis of a portion of a subject contained within each pixel of the one or more pixels, based on the label assigned to the one or more pixels.

Clause 27: The method of clause 26, further comprising: classifying the segmented image into at least one class based on a probability score, wherein the probability score indicates a likelihood that the segmented image contains an image of the portion of the subject belonging to the at least one class, the probability score based on a ratio of an average probability of the segmented image across the at least one class to a sum of average probabilities of the segmented image across each diagnostic class of a total of diagnostic classes, given by:

$$CSL(k, I_s) = \frac{\exp(CSS(k, I_s))}{\sum_{m \in A} \exp(CSS(m, I_s))},$$

wherein the average probability of the segmented image across the at least one class is based on a ratio of a sum of average probabilities of each pixel of a total number of pixels across each diagnostic class of the total of diagnostic classes to the total number of pixels, given by:

$$CSS(m, I_s) = \frac{\sum_{p=1}^{n} I_s(m, p)}{n};$$

and assigning a classification label indicating a diagnosis of the portion of the subject to the segmented image to generate a classified image, wherein the classification label is assigned to the segmented image based on the probability score.

Clause 28: The method of clause 26 or 27, wherein the clinical label comprises a diagnostic label, wherein the diagnostic label comprises: a label associated with a benign lesion, a label associated with a malignant lesion, a label associated with background, or any combination thereof.

Clause 29: The method of any of clauses 26-28 further comprising classifying the segmented image into a benign lesion class or a malignant lesion class based on a probability score, wherein the probability score indicates a likelihood that the segmented image contains an image of the portion of the subject belonging to the malignant lesion class, the probability score based on a ratio of an average probability of the segmented image across the malignant lesion class to a sum of the average probability of the segmented image across the malignant lesion class and an average probability of the segmented image across the benign lesion class, given by:

$$P_m(I_s) = \frac{\exp(M(I_s))}{\exp(M(I_s)) + \exp(B(I_s))}.$$

Clause 30: The method of any of clauses 26-29, wherein the at least one machine-learning model comprises a W-Net architecture, an AW-Net architecture, or any combination thereof.

Clause 31: The method of any of clauses 27-30, wherein the classification labels comprise: a label associated with a malignant lesion, a label associated with a benign lesion, or any combination thereof.

Clause 32: The method of any of clauses 26-31, wherein the image comprises a grey ultrasound image.

Clause 33: The method of any of clauses 26-32, wherein the image comprises a radio frequency (RF) ultrasound image.

Clause 34: The method of any of clauses 26-33, wherein the image comprises at least one radio frequency (RF) ultrasound image and at least one grey ultrasound image.

Clause 35: The method of any of clauses 26-34, wherein the portion of the subject is subcutaneous tissue.

Clause 36: The method of any of clauses 26-35, wherein the portion of the subject is a breast lesion.

Clause 37: The method of any of clauses 26-36, wherein the image is a sequence of images captured over time.

Clause 38: A system comprising at least one computing device programmed or configured to: receive an image of a portion of a subject; assign, based on a segmentation machine-learning model, a label to each pixel of the image to generate a segmented image; and classify, based on a classification machine-learning model, the segmented image into at least one class to generate a classified image, wherein the classified image comprises a classification label indicating a clinical assessment of the portion of the subject, based on the segmented image having labels assigned to each pixel of the segmented image.

Clause 39: The system of clause 38, wherein the label comprises: a label associated with A-line, a label associated with B-line, a label associated with healthy pleural line, a label associated with unhealthy pleural line, a label associated with healthy region, a label associated with unhealthy region, a label associated with background, or any combination thereof.

Clause 40: The system of clause 38 or 39, wherein the classification label comprises: a label associated with COVID-19, a label associated with pneumonia, a label associated with normal, a label associated with a pulmonary disease, or any combination thereof.

Clause 41: The system of any of clauses 38-40, wherein the image comprises a grey ultrasound image.

Clause 42: The system of any of clauses 38-41, wherein the image comprises a radio frequency (RF) ultrasound image.

Clause 43: The system of any of clauses 38-42, wherein the portion of the subject is a lung region.

Clause 44: The system of any of clauses 38-43, the at least one computing device further programmed or configured to: generate the classification machine-learning model by training the classification machine-learning model using the segmented image as input, wherein the classification machine-learning model comprises pre-trained weights of the segmentation machine-learning model.

Clause 45: The system of any of clauses 38-44, wherein the image is a sequence of images captured over time.

Clause 46: The system of any of clauses 38-45, wherein each pixel of the segmented image is labeled with one or more labels, the labels comprising: one or more labels associated with anatomic tissue type, one or more labels associated with diagnostic artifact type, one or more labels associated with a visual descriptor, or any combination thereof.

Clause 47: The system of any of clauses 38-46, wherein the image comprises at least one radio frequency (RF) ultrasound image and at least one grey ultrasound image.

Clause 48: The system of any of clauses 38-47, wherein the label assigned to each pixel of the image to generate the segmented image is a tissue-type label, wherein the tissue-type label comprises: a label associated with skin, a label associated with fat, a label associated with fat fascia, a label associated with muscle, a label associated with muscle fascia, a label associated with bone, a label associated with vessels, a label associated with nerves, a label associated with lymphatic structures, a label associated with tumors, or any combination thereof.

Clause 49: The system of any of clauses 38-48, wherein the segmentation machine-learning model comprises a W-Net architecture, an AW-Net architecture, or any combination thereof.

Clause 50: The system of any of clauses 38-49, wherein the classification machine-learning model comprises a W-Net architecture, an AW-Net architecture, or any combination thereof.

Clause 51: A system comprising at least one computing device programmed or configured to: receive an image of a portion of a subject; assign, based on at least one machine-learning model, diagnostic labels to one or more pixels of the image to generate a diagnostically segmented image; and classify, based on the at least one machine-learning model, the diagnostically segmented image into at least one class to generate a classified image, wherein the classified image comprises a classification label indicating a diagnosis of the portion of the subject, based on the diagnostically segmented image having diagnostic labels assigned to the one or more pixels of the segmented image.

Clause 52: The system of clause 51, wherein classifying the segmented image into at least one class comprises: determining a probability score, wherein the probability score indicates a likelihood that the segmented image contains an image of the portion of the subject belonging to the at least one class, the probability score based on a ratio of an average probability of the segmented image across the at least one class to a sum of average probabilities of the segmented image across each diagnostic class of a total of diagnostic classes, given by:

$$CSL(k, I_s) = \frac{\exp(CSS(k, I_s))}{\sum_{m \in A} \exp(CSS(m, I_s))},$$

wherein the average probability of the segmented image across the at least one class is based on a ratio of a sum of average probabilities of the one or more pixels of a total number of pixels in the segmented image across each diagnostic class of the total of diagnostic classes to the total number of pixels, given by:

$$CSS(m, I_s) = \frac{\sum_{p=1}^{n} I_s(m, p)}{n};$$

and assigning the classification label indicating a diagnosis of the portion of the subject to the segmented image to generate the classified image, wherein the classification label is assigned to the segmented image based on the probability score.

Clause 53: The system of clause 51 or 52, wherein the segmented image is classified into a benign lesion class or a malignant lesion class based on a probability score, wherein the probability score indicates a likelihood that the segmented image contains an image of the portion of the subject belonging to the malignant lesion class, the probability score based on a ratio of an average probability of the segmented image across the malignant lesion class to a sum of the average probability of the segmented image across the malignant lesion class and an average probability of the segmented image across the benign lesion class, given by:

$$P_m(I_s) = \frac{\exp(M(I_s))}{\exp(M(I_s)) + \exp(B(I_s))}.$$

Clause 54: The system of any of clauses 51-53, wherein the diagnostic labels comprise: a label associated with a benign lesion, a label associated with a malignant lesion, a label associated with background, or any combination thereof.

Clause 55: The system of any of clauses 51-54, wherein the classification labels comprise: a label associated with a malignant lesion, a label associated with a benign lesion, or any combination thereof.

Clause 56: The system of any of clauses 51-55, wherein the at least one machine-learning model comprises a W-Net architecture, an AW-Net architecture, or any combination thereof.

Clause 57: The system of any of clauses 51-56, wherein the image comprises a grey ultrasound image.

Clause 58: The system of any of clauses 51-57, wherein the image comprises a radio frequency (RF) ultrasound image.

Clause 59: The system of any of clauses 51-58, wherein the image comprises at least one radio frequency (RF) ultrasound image and at least one grey ultrasound image.

Clause 60: The system of any of clauses 51-59, wherein the portion of the subject is subcutaneous tissue.

Clause 61: The system of any of clauses 51-60, wherein the portion of the subject is a breast lesion.

Clause 62: The system of any of clauses 51-61, wherein the image is a sequence of images captured over time.

Clause 63: A system comprising at least one computing device programmed or configured to: receive an image of a portion of a subject; assign, based on at least one machine-learning model, a label to one or more pixels of the image to generate a segmented image; and classify, based on the at least one machine-learning model, the one or more pixels into at least one class to generate a diagnostic segmented image, wherein the one or more pixels comprise a clinical label indicating a diagnosis of a portion of a subject contained within each pixel of the one or more pixels, based on the label assigned to the one or more pixels.

Clause 64: The system of clause 63, the at least one computing device further programmed or configured to: classify the segmented image into at least one class based on a probability score, wherein the probability score indicates a likelihood that the segmented image contains an image of the portion of the subject belonging to the at least one class, the probability score based on a ratio of an average probability of the segmented image across the at least one class to a sum of average probabilities of the segmented image across each diagnostic class of a total of diagnostic classes, given by:

$$CSL(k, I_s) = \frac{\exp(CSS(k, I_s))}{\sum_{m \in A} \exp(CSS(m, I_s))},$$

wherein the average probability of the segmented image across the at least one class is based on a ratio of a sum of average probabilities of each pixel of a total number of pixels across each diagnostic class of the total of diagnostic classes to the total number of pixels, given by:

$$CSS(m, I_s) = \frac{\sum_{p=1}^{n} I_s(m, p)}{n};$$

and assign a classification label indicating a diagnosis of the portion of the subject to the segmented image to generate a classified image, wherein the classification label is assigned to the segmented image based on the probability score.

Clause 65: The system of clause 63 or 64, wherein the clinical label comprises a diagnostic label, wherein the diagnostic label comprises: a label associated with a benign lesion, a label associated with a malignant lesion, a label associated with background, or any combination thereof.

Clause 66: The system of any of clauses 63-65, the at least one computing device further programmed or configured to classify the segmented image into a benign lesion class or a malignant lesion class based on a probability score, wherein the probability score indicates a likelihood that the segmented image contains an image of the portion of the subject belonging to the malignant lesion class, the probability score based on a ratio of an average probability of the segmented image across the malignant lesion class to a sum of the average probability of the segmented image across the malignant lesion class and an average probability of the segmented image across the benign lesion class, given by:

$$P_m(I_s) = \frac{\exp(M(I_s))}{\exp(M(I_s)) + \exp(B(I_s))}.$$

Clause 67: The system of any of clauses 63-66, wherein the at least one machine-learning model comprises a W-Net architecture, an AW-Net architecture, or any combination thereof.

Clause 68: The system of any of clauses 63-67, wherein the classification labels comprise: a label associated with a malignant lesion, a label associated with a benign lesion, or any combination thereof.

Clause 69: The system of any of clauses 63-68, wherein the image comprises a grey ultrasound image.

Clause 70: The system of any of clauses 63-69, wherein the image comprises a radio frequency (RF) ultrasound image.

Clause 71: The system of any of clauses 63-70, wherein the image comprises at least one radio frequency (RF) ultrasound image and at least one grey ultrasound image.

Clause 72: The system of any of clauses 63-71, wherein the portion of the subject is subcutaneous tissue.

Clause 73: The system of any of clauses 63-72, wherein the portion of the subject is a breast lesion.

Clause 74: The system of any of clauses 63-73, wherein the image is a sequence of images captured over time.

Clause 75: A computer program product comprising at least one non-transitory computer-readable medium including instructions that, when executed by at least one computing device, cause the at least one computing device to: receive an image of a portion of a subject; assign, based on a segmentation machine-learning model, a label to each pixel of the image to generate a segmented image; and classify, based on a classification machine-learning model, the segmented image into at least one class to generate a classified image, wherein the classified image comprises a classification label indicating a clinical assessment of the portion of the subject, based on the segmented image having labels assigned to each pixel of the segmented image.

Clause 76: The computer program product of clause 75, wherein the label comprises: a label associated with A-line, a label associated with B-line, a label associated with healthy pleural line, a label associated with unhealthy pleural line, a label associated with healthy region, a label associated with unhealthy region, a label associated with background, or any combination thereof.

Clause 77: The computer program product of clause 75 or 76, wherein the classification label comprises: a label associated with COVID-19, a label associated with pneumonia, a label associated with normal, a label associated with a pulmonary disease, or any combination thereof.

Clause 78: The computer program product of any of clauses 75-77, wherein the image comprises a grey ultrasound image.

Clause 79: The computer program product of any of clauses 75-78, wherein the image comprises a radio frequency (RF) ultrasound image.

Clause 80: The computer program product of any of clauses 75-79, wherein the portion of the subject is a lung region.

Clause 81: The computer program product of any of clauses 75-80, wherein the program instructions further cause the at least one computing device to: generate the classification machine-learning model by training the classification machine-learning model using the segmented image as input, wherein the classification machine-learning model comprises pre-trained weights of the segmentation machine-learning model.

Clause 82: The computer program product of any of clauses 75-81, wherein the image is a sequence of images captured over time.

Clause 83: The computer program product of any of clauses 75-82, wherein each pixel of the segmented image is labeled with one or more labels, the labels comprising: one or more labels associated with anatomic tissue type, one or more labels associated with diagnostic artifact type, one or more labels associated with a visual descriptor, or any combination thereof.

Clause 84: The computer program product of any of clauses 75-83, wherein the image comprises at least one radio frequency (RF) ultrasound image and at least one grey ultrasound image.

Clause 85: The computer program product of any of clauses 75-84, wherein the label assigned to each pixel of the image to generate the segmented image is a tissue-type label, wherein the tissue-type label comprises: a label associated with skin, a label associated with fat, a label associated with fat fascia, a label associated with muscle, a label associated with muscle fascia, a label associated with bone, a label associated with vessels, a label associated with nerves, a label associated with lymphatic structures, a label associated with tumors, or any combination thereof.

Clause 86: The computer program product of any of clauses 75-85, wherein the segmentation machine-learning model comprises a W-Net architecture, an AW-Net architecture, or any combination thereof.

Clause 87: The computer program product of any of clauses 75-86, wherein the classification machine-learning model comprises a W-Net architecture, an AW-Net architecture, or any combination thereof.

Clause 88: A computer program product comprising at least one non-transitory computer-readable medium including instructions that, when executed by at least one computing device, cause the at least one computing device to: receive an image of a portion of a subject; assign, based on at least one machine-learning model, diagnostic labels to one or more pixels of the image to generate a diagnostically segmented image; and classify, based on the at least one machine-learning model, the diagnostically segmented image into at least one class to generate a classified image, wherein the classified image comprises a classification label indicating a diagnosis of the portion of the subject, based on the diagnostically segmented image having diagnostic labels assigned to the one or more pixels of the segmented image.

Clause 89: The computer program product of clause 88, wherein classifying the segmented image into at least one class comprises: determining a probability score, wherein the probability score indicates a likelihood that the segmented image contains an image of the portion of the subject belonging to the at least one class, the probability score based on a ratio of an average probability of the segmented image across the at least one class to a sum of average probabilities of the segmented image across each diagnostic class of a total of diagnostic classes, given by:

$$CSL(k, I_s) = \frac{\exp(CSS(k, I_s))}{\sum_{m \in A} \exp(CSS(m, I_s))},$$

wherein the average probability of the segmented image across the at least one class is based on a ratio of a sum of average probabilities of the one or more pixels of a total number of pixels in the segmented image across each diagnostic class of the total of diagnostic classes to the total number of pixels, given by:

$$CSS(m, I_s) = \frac{\sum_{p=1}^{n} I_s(m, p)}{n};$$

and assigning the classification label indicating a diagnosis of the portion of the subject to the segmented image to generate the classified image, wherein the classification label is assigned to the segmented image based on the probability score.

Clause 90: The computer program product of clause 88 or 89, wherein the segmented image is classified into a benign lesion class or a malignant lesion class based on a probability score, wherein the probability score indicates a likelihood that the segmented image contains an image of the portion of the subject belonging to the malignant lesion class, the probability score based on a ratio of an average probability of the segmented image across the malignant lesion class to a sum of the average probability of the segmented image across the malignant lesion class and an average probability of the segmented image across the benign lesion class, given by:

$$P_m(I_s) = \frac{\exp(M(I_s))}{\exp(M(I_s)) + \exp(B(I_s))}.$$

Clause 91: The computer program product of any of clauses 88-90, wherein the diagnostic labels comprise: a label associated with a benign lesion, a label associated with a malignant lesion, a label associated with background, or any combination thereof.

Clause 92: The computer program product of any of clauses 88-91, wherein the classification labels comprise: a label associated with a malignant lesion, a label associated with a benign lesion, or any combination thereof.

Clause 93: The computer program product of any of clauses 88-92, wherein the at least one machine-learning model comprises a W-Net architecture, an AW-Net architecture, or any combination thereof.

Clause 94: The computer program product of any of clauses 88-93, wherein the image comprises a grey ultrasound image.

Clause 95: The computer program product of any of clauses 88-94, wherein the image comprises a radio frequency (RF) ultrasound image.

Clause 96: The computer program product of any of clauses 88-95, wherein the image comprises at least one radio frequency (RF) ultrasound image and at least one grey ultrasound image.

Clause 97: The computer program product of any of clauses 88-96, wherein the portion of the subject is subcutaneous tissue.

Clause 98: The computer program product of any of clauses 88-97, wherein the portion of the subject is a breast lesion.

Clause 99: The computer program product of any of clauses 88-98, wherein the image is a sequence of images captured over time.

Clause 100: A computer program product comprising at least one non-transitory computer-readable medium including instructions that, when executed by at least one computing device, cause the at least one computing device to: receive an image of a portion of a subject; assign, based on at least one machine-learning model, a label to one or more pixels of the image to generate a segmented image; and classify, based on the at least one machine-learning model, the one or more pixels into at least one class to generate a diagnostic segmented image, wherein the one or more pixels comprise a clinical label indicating a diagnosis of a portion of a subject contained within each pixel of the one or more pixels, based on the label assigned to the one or more pixels.

Clause 101: The computer program product of clause 100, wherein the program instructions further cause the at least one computing device to: classify the segmented image into at least one class based on a probability score, wherein the probability score indicates a likelihood that the segmented image contains an image of the portion of the subject belonging to the at least one class, the probability score based on a ratio of an average probability of the segmented image across the at least one class to a sum of average probabilities of the segmented image across each diagnostic class of a total of diagnostic classes, given by:

$$CSL(k, I_s) = \frac{\exp(CSS(k, I_s))}{\sum_{m \in A} \exp(CSS(m, I_s))},$$

wherein the average probability of the segmented image across the at least one class is based on a ratio of a sum of average probabilities of each pixel of a total number of pixels across each diagnostic class of the total of diagnostic classes to the total number of pixels, given by:

$$CSS(m, I_s) = \frac{\sum_{p=1}^{n} I_s(m, p)}{n};$$

and assign a classification label indicating a diagnosis of the portion of the subject to the segmented image to generate a classified image, wherein the classification label is assigned to the segmented image based on the probability score.

Clause 102: The computer program product of clause 100 or 101, wherein the clinical label comprises a diagnostic label, wherein the diagnostic label comprises: a label associated with a benign lesion, a label associated with a malignant lesion, a label associated with background, or any combination thereof.

Clause 103: The computer program product of any of clauses 100-102, wherein the program instructions further cause the at least one computing device to classify the segmented image into a benign lesion class or a malignant lesion class based on a probability score, wherein the probability score indicates a likelihood that the segmented image contains an image of the portion of the subject belonging to the malignant lesion class, the probability score based on a ratio of an average probability of the segmented image across the malignant lesion class to a sum of the average probability of the segmented image across the malignant lesion class and an average probability of the segmented image across the benign lesion class, given by:

$$P_m(I_s) = \frac{\exp(M(I_s))}{\exp(M(I_s)) + \exp(B(I_s))}.$$

Clause 104: The computer program product of any of clauses 100-103, wherein the at least one machine-learning model comprises a W-Net architecture, an AW-Net architecture, or any combination thereof.

Clause 105: The computer program product of any of clauses 100-104, wherein the classification labels comprise: a label associated with a malignant lesion, a label associated with a benign lesion, or any combination thereof.

Clause 106: The computer program product of any of clauses 100-105, wherein the image comprises a grey ultrasound image.

Clause 107: The computer program product of any of clauses 100-106, wherein the image comprises a radio frequency (RF) ultrasound image.

Clause 108: The computer program product of any of clauses 100-107, wherein the image comprises at least one radio frequency (RF) ultrasound image and at least one grey ultrasound image.

Clause 109: The computer program product of any of clauses 100-108, wherein the portion of the subject is subcutaneous tissue.

Clause 110: The computer program product of any of clauses 100-109, wherein the portion of the subject is a breast lesion.

Clause 111: The computer program product of any of clauses 100-110, wherein the image is a sequence of images captured over time.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Additional advantages and details are explained in greater detail below with reference to the non-limiting, exemplary embodiments that are illustrated in the accompanying figures, in which.

DETAILED DESCRIPTION

Figure 1:
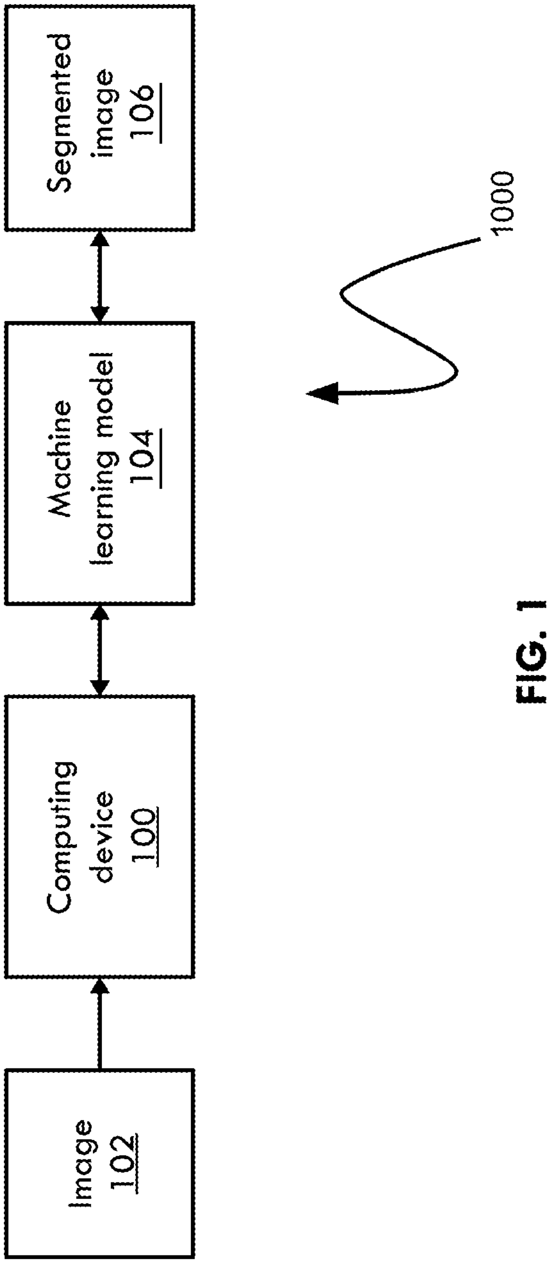
FIG. 1 illustrates a system for direct diagnostic and prognostic semantic segmentation of images according to non-limiting embodiments.

It is to be understood that the embodiments may assume various alternative variations and step sequences, except where expressly specified to the contrary. It is also to be understood that the specific devices and processes illustrated in the attached appendix, and described in the following specification, are simply exemplary embodiments or aspects of the disclosure. Hence, specific dimensions and other physical characteristics related to the embodiments or aspects disclosed herein are not to be considered as limiting. No aspect, component, element, structure, act, step, function, instruction, and/or the like used herein should be construed as critical or essential unless explicitly described as such. Also, as used herein, the articles “a” and “an” are intended to include one or more items and may be used interchangeably with “one or more” and “at least one.” Also, as used herein, the terms “has,” “have,” “having,” or the like are intended to be open-ended terms. Further, the phrase “based on” is intended to mean “based at least partially on” unless explicitly stated otherwise.

As used herein, the term “computing device” may refer to one or more electronic devices configured to process data. A computing device may, in some examples, include the necessary components to receive, process, and output data, such as a processor, a display, a memory, an input device, a network interface, and/or the like. A computing device may be a mobile device. A computing device may also be a desktop computer or other form of non-mobile computer. In non-limiting embodiments, a computing device may include an artificial intelligence (AI) accelerator, including an application-specific integrated circuit (ASIC) neural engine such as Apple’s M1® “Neural Engine” or Google’s TENSORFLOW® processing unit. In non-limiting embodiments, a computing device may be comprised of a plurality of individual circuits.

As used herein, the term “subject” may refer to a person (e.g., a human body), an animal, a medical patient, and/or the like. A subject may have a skin or skin-like surface.

Some non-limiting embodiments or aspects described herein provide the concepts of Diagnostic and/or Prognostic Semantic Segmentation, which are defined herein as semantic segmentation carried out for the purposes of direct diagnostic, prognostic, and/or clinical assessment labeling of individual pixels, with the possibility of concurrent anatomic/object labeling of pixels.

In non-limiting embodiments, provided are systems, methods, and computer program products for direct diagnostic and prognostic semantic segmentation of images. The systems, methods, and computer program products may segment images such as, but not limited to, two-dimensional (2D) ultrasound images. The systems, methods, and computer program products in non-limiting embodiments improve upon existing techniques for segmenting ultrasound images, producing more accurate results and an efficient use of computing resources. Techniques described herein provide a single-task segmentation and classification approach using a machine-learning model to segment an ultrasound image using both the grey ultrasound image along with the accompanying raw RF data. RF data provides not only more information, but information of a fundamentally different type that enables additional types of analyses which can be performed on ultrasound image data. Use of the entire set of raw RF ultrasound data in segmentation and classification, along with the grey ultrasound image, produces improved segmentation accuracy for different types of classes, including classes of subcutaneous tissue regions. Use of raw RF ultrasound data may also improve the accuracy of the classification of the entire ultrasound image using the systems, methods, and computer program products described here. The techniques described herein can automatically estimate a probability of a pixel belonging to a class for each pixel in an RF ultrasound image and/or a grey ultrasound image. The ability to classify each pixel in an image independently allows for improved learning of the machine-learning model in segmentation of regions within the image and classification of the image. The techniques described can then provide a whole-image classification on a segmented image. For example, non-limiting embodiments can utilize per-pixel probability information to determine a per-image probability that the image may be classified into a diagnostic or prognostic class, such as a malignant lesion. Non-limiting embodiments can be used to improve the classification of medical images and improve the accuracy of its per-pixel classification and per-image segmentation and classification. Non-limiting embodiments may also be used to improve the accuracy of diagnostic and/or prognostic segmentation and classification of individual pixels within an image.

FIG. 1 shows a system 1000 for direct diagnostic and prognostic semantic segmentation of images according to non-limiting embodiments. As shown in FIG. 1, system 1000 may include computing device 100, image 102, machine-learning (ML) model 104, and segmented image 106.

In some non-limiting embodiments or aspects, computing device 100 may include a storage component such that computing device 100 may store image 102. In some non-limiting embodiments or aspects, an imaging device may be separate from computing device 100, such as one or more software applications executing on one or more imaging devices in communication with computing device 100. Alternatively, computing device 100 may be incorporated (e.g., completely, partially, and/or the like) into the one or more imaging devices, such that computing device 100 is implemented by the software and/or hardware of the one or more imaging devices. In some non-limiting embodiments or aspects, computing device 100 and the one or more imaging devices may communicate via a communication interface that is wired (e.g., local area network (LAN)), wireless (e.g., wireless area network (WAN)), or other communication technology such as the Internet, Bluetooth®, and/or the like.

In some non-limiting embodiments or aspects, computing device 100 may receive image 102. In some non-limiting embodiments or aspects, computing device 100 may receive image 102 from a storage component residing on computing device 100 or residing on a separate computing device in communication with computing device 100. In some non-limiting embodiments or aspects, computing device 100 may receive a plurality of images 102. The plurality of images 102 may comprise a sequence of images 102. In some non-limiting embodiments or aspects, image 102 may include a plurality of images arranged as a sequence of images over time (e.g. images captured over time by an imaging device, video, and/or the like). In some non-limiting embodiments or aspects, computing device 100 may receive image 102 from an imaging device in communication with computing device 100. Computing device 100 may receive image 102 from the imaging device in real-time with respect to the imaging device capturing image 102.

In some non-limiting embodiments or aspects, image 102 may include an ultrasound image including RF waveform data. Image 102 may include a spectral image including the RF waveform data to form an RF image. In some non-limiting embodiments or aspects, image 102 may include one or more RF images or a sequence of RF images. In some non-limiting embodiments or aspects, image 102 may include a sequence of RF images captured from an imaging device, such as an ultrasound imaging device. In some non-limiting embodiments or aspects, image 102 may include one or more intermediate images derived from RF images; such intermediate images could be used in place of grey images and/or in place of RF images. It will be appreciated that other imaging techniques and types of images may be used, and that ultrasound is used herein as an example.

In some non-limiting embodiments or aspects, image 102 may be captured by an imaging device and stored in a storage component. In some non-limiting embodiments or aspects, image 102 may be captured by the imaging device and sent to computing device 100 in real-time with respect to the imaging device capturing image 102. In some non-limiting embodiments or aspects, image 102 may be sent to computing device 100 from a storage component some time (e.g., hours, days, months, etc.) after being captured by the imaging device. In some non-limiting embodiments or aspects, image 102 may include an RF image generated by performing spectral analysis on raw RF waveform data.

In some non-limiting embodiments or aspects, image 102 may include a grey (e.g., greyscale) ultrasound image. In some non-limiting embodiments or aspects, image 102 may include one or more grey ultrasound images or a sequence of grey ultrasound images. In some non-limiting embodiments or aspects, image 102 may include a sequence of RF images captured from an imaging device, such as an ultrasound imaging device. It will be appreciated that other imaging techniques and types of images may be used, and that ultrasound is used herein as an example.

Image 102 may be processed by a computing device 100 to produce segmented image 106 in which images captured and/or a portion of a subject captured in image 102 may be identified and/or classified. For example, image 102 may include an image of a portion of a subject including subcutaneous tissue. In some non-limiting embodiments or aspects, the portion of the subject may include a lung region (e.g., an image of a portion of a lung region of a subject). In some non-limiting embodiments or aspects, the portion of the subject may include a breast and/or breast legion (e.g., an image of a portion of a breast region of a subject and/or a breast lesion). A portion of a subject, as used herein, may include a portion of a subject and an entire subject (e.g., image 102 may include an image of an entire subject). Computing device 100 and/or ML model 104 may identify the portion of the subject in image 102 and computing device 100 and/or ML model 104 may classify the portion of the subject. In some non-limiting embodiments or aspects, where the portion of the subject is subcutaneous tissue, ML model 104 may classify subcutaneous tissue as a specific type of tissue by assigning a label to the portion of the subject including subcutaneous tissue. Additionally or alternatively, image 102 and/or segmented image 106 may include one or more pixels which may be assigned a label to identify pixels as belonging to at least one class. For example, ML model 104 may classify each pixel of image 102 and/or segmented image 106 as belonging to at least one class of subcutaneous tissue. In some non-limiting embodiments or aspects, a class may be a diagnostic class, a prognostic class, or any other medically relevant class. For example, a diagnostic class may include a malignant class, a benign class, and/or the like. A prognostic class may include a B-line class and/or the like.

In some non-limiting embodiments or aspects, ML model 104 may include at least one convolutional neural network (CNN) (e.g., W-Net, U-Net, AU-Net, AW-Net, SegNet, and/or the like), as described herein. In some non-limiting embodiments or aspects, ML model 104 may include a segmentation machine-learning model. In some non-limiting embodiments or aspects, ML model 104 may include a classification machine-learning model.

In some non-limiting embodiments or aspects, a segmentation machine-learning model may be repurposed to perform frame-level classification, volume-level classification, video-level classification, and/or classification of higher-dimensional inputs with additional learnable layers that aggregate the segmentation image output to provide classification output. In some non-limiting embodiments or aspects, the additional learnable layers may operate on the final SoftMax® layer output of a segmentation ML model. In some non-limiting embodiments or aspects, the additional learnable layers may operate on segmented image 106. In other non-limiting embodiments or aspects, the additional learnable layers may operate on the outputs of one or more intermediate layers of ML model 104, such as a segmentation ML model. In some non-limiting embodiments or aspects, the additional learnable layers may operate on any combination of the final SoftMax® layer output and/or outputs of one or more intermediate layers of an ML model. The technique of repurposing a segmentation machine-learning model to perform frame level classification may be referred to as reverse transfer learning. In some non-limiting embodiments or aspects, reverse transfer learning may include the application of transfer learning to solve a simple task using an ML model trained on a more complex task. The use of a segmentation machine-learning model to perform a classification task may improve the interpretability of the ML model's predictions and may also improve generalization of the ML model to unseen images.

In some non-limiting embodiments or aspects, ML model 104 may include a segmentation machine-learning model which may be capable of generating segmentation image 106 as output. In some non-limiting embodiments or aspects, computing device 100 and/or ML model 104 may repurpose a segmentation machine-learning model by training the segmentation machine-learning model with reverse transfer learning using segmented image 106 as input. In some non-limiting embodiments or aspects, reverse transfer learning may include the use of pre-trained weights of the segmentation machine-learning model to retrain the segmentation machine-learning model to perform a classification task. For example, if ML model 104 includes a segmentation machine-learning model, ML model 104 may generate segmentation image 106 as output based on image 102. ML model 104 may then be re-trained to perform a classification task wherein training ML model 104 to perform classification includes initializing ML model 104 using some or all pre-trained weights from previous training of ML model 104 in order to perform segmentation. In some non-limiting embodiments or aspects, ML model 104 may include a segmentation machine-learning model and may be trained (e.g., converted, adapted, and/or the like) to perform a classification task as a classification machine-learning model (e.g., ML model 104 may perform segmentation and classification of image 102 in a single task).

In some non-limiting embodiments or aspects, ML model 104 may be separate from computing device 100, such as one or more software applications executing on one or more computing devices in communication with computing device 100. Alternatively, ML model 104 may be incorporated (e.g., completely, partially, and/or the like) into computing device 100, such that ML model 104 is implemented by the software and/or hardware of computing device 100. In some non-limiting embodiments or aspects, computing device 100 and ML model 104 may communicate via a communication interface that is wired (e.g., LAN), wireless (e.g., WAN), or other communication technology such as the Internet, Bluetooth®, and/or the like.

In some non-limiting embodiments or aspects, ML 104 may receive image 102 from computing device 100 as input. In some non-limiting embodiments or aspects, ML model 104 may process image 102 for training. Additionally or alternatively, ML model 104 may process image 102 to generate segmented image 106. In some non-limiting embodiments or aspects, ML model 104 may process image 102 to assign labels to a portion of a subject contained in image 102 and/or assign labels to one or more pixels of image 102. In some non-limiting embodiments or aspects, ML model 104 may process image 102 to classify segmented image 106. Additionally or alternatively, ML model 104 may process image 102 to classify one or more pixels into at least one class to generate a diagnostic segmented image 106.

In some non-limiting embodiments or aspects, segmented image 106 may include an RF ultrasound image and/or a grey ultrasound image. In some non-limiting embodiments or aspects, segmented image 106 may include an image formed by concatenating an RF ultrasound image and a grey ultrasound image. Segmented image 106 may include features which are identified and/or isolated (e.g., separated and/or segmented) from other parts of segmented image 106.

In some non-limiting embodiments or aspects, segmented image 106 may be generated by ML model 104. In some non-limiting embodiments or aspects, segmented image 106 may be provided to ML model 104 as input for processing such that ML model 104 may classify segmented image 106. In some non-limiting embodiments or aspects, segmented image 106 may be stored in a storage component for later processing by ML model 104. In some non-limiting embodiments or aspects, segmented image 106 may include a sequence of segmented images which may be generated by ML model 104 based on ML model 104 processing a sequence of RF images and/or a sequence of grey images. In some non-limiting embodiments or aspects, the sequence of segmented images may be provided to ML model 104 as input for processing and/or training such that ML model 104 may classify each segmented image 106 in the sequence of segmented images to produce a sequence of classified images.

Figure 2:
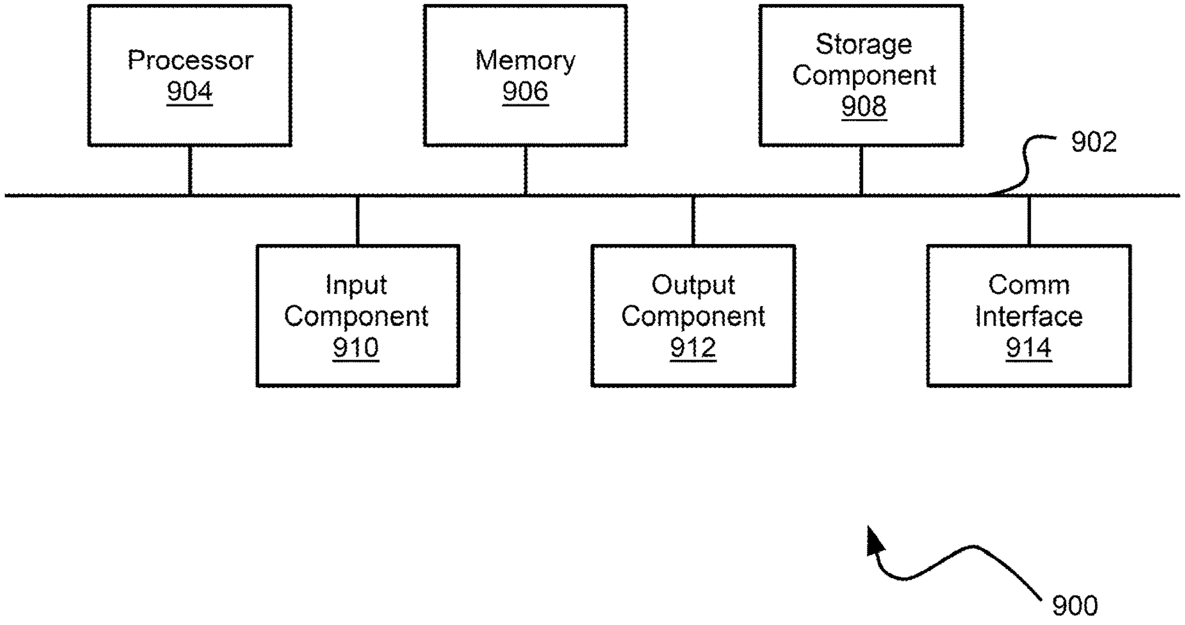
FIG. 2 illustrates example components of a computing device used in connection with non-limiting embodiments.

Referring now to FIG. 2, shown is a diagram of example components of a computing device 900 for implementing and performing the systems and methods described herein according to non-limiting embodiments. In some non-limiting embodiments, device 900 may include additional components, fewer components, different components, or differently arranged components than those shown. Device 900 may include a bus 902, a processor 904, memory 906, a storage component 908, an input component 910, an output component 912, and a communication interface 914. Bus 902 may include a component that permits communication among the components of device 900. In some non-limiting embodiments, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 2, storage component 908 may store information and/or software related to the operation and use of device 900. For example, storage component 908 may include a hard disk (e.g., a magnetic disk, an optical disk, a magneto-optic disk, a solid state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi™ interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Figure 3:
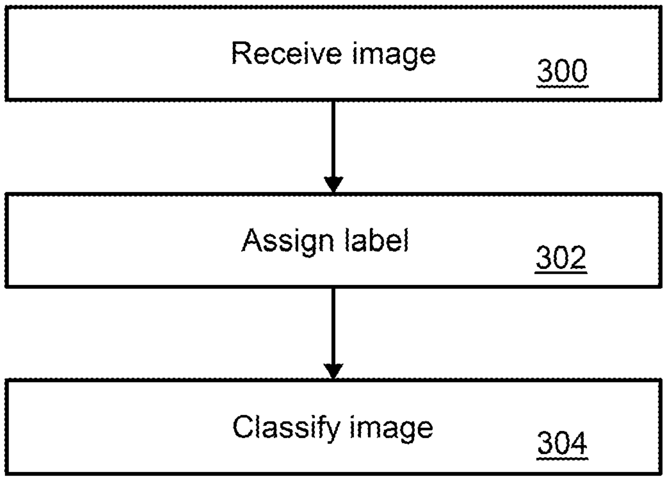
FIG. 3 illustrates a flow diagram of a method for direct diagnostic and prognostic semantic segmentation of images according to non-limiting embodiments.

Referring now to FIG. 3, shown is a flow diagram of a method for direct diagnostic and prognostic semantic segmentation of images according to non-limiting embodiments. The steps shown in FIG. 3 are for example purposes only. It will be appreciated that additional, fewer, different, and/or a different order of steps may be used in non-limiting embodiments. At a first step 300, the method may include receiving an image. For example, computing device 100 and/or ML model 104 may receive image 102. The image may include at least one RF ultrasound image and/or at least one grey ultrasound image. In some non-limiting embodiments or aspects, the image may include one or more RF ultrasound images and/or one or more grey ultrasound images such that the one or more RF ultrasound images are in a sequence and/or the one or more grey ultrasound images are in a sequence. For example, the image may include a sequence of RF ultrasound images captured over time and/or a sequence of grey ultrasound images captured over time, wherein the sequence of RF ultrasound images and/or the sequence of grey ultrasound images include images captured by an imaging device. In some examples, the image and/or sequence of images may have been previously captured and stored in a data storage component, such as storage component 908.

In some non-limiting embodiments or aspects, computing device 100 and/or ML model 104 may receive an image including a portion of a subject. The portion of the subject may include skin, fat, muscle, a lung, a breast, subcutaneous tissue, and/or the like. In some non-limiting embodiments or aspects, the image may include a plurality of pixels. In cases where the image includes at least one RF ultrasound image and/or at least one grey ultrasound image, one or more pixels of the at least one RF ultrasound image may correspond to one or more pixels of the at least one grey ultrasound image such that the at least one RF ultrasound image and the at least one grey ultrasound image correspond to one another. In a sequence of RF ultrasound images and a sequence of grey ultrasound images, each image of the sequence of RF ultrasound images may correspond to an image of the sequence of grey ultrasound images in a one-to-one relationship as respective images.

In some non-limiting embodiments or aspects, one or more pixels in an RF ultrasound image and one or more pixels in a grey ultrasound image may correspond based on a position in an image grid. For example, the top-left-most pixel in an RF ultrasound image may correspond to the top-left-most pixel in a grey ultrasound image. In some non-limiting embodiments or aspects, pixels in an RF ultrasound image may correspond to pixels in a grey ultrasound image based on an identifier. In some non-limiting embodiments or aspects, an identifier may include, but is not limited to, an integer, a character, a string, a hash, and/or the like.

In some non-limiting embodiments or aspects, an RF ultrasound image and a grey ultrasound image may correspond such that the images are captured by the same imaging device at the same time when imaging a portion of a subject. An RF ultrasound image may represent the frequency of signals over time reflected from the portion of the subject being imaged which are received at the imaging device. A grey ultrasound image may represent the amplitude of signals over time reflected from the portion of the subject being imaged which are received at the imaging device. An RF ultrasound image and a grey ultrasound image may represent different types of information; however, each may be generated concurrently through image capture of a portion of a subject by an imaging device. An RF ultrasound image and/or raw RF waveform data and a grey ultrasound image captured at the same moment in time may be considered to correspond. In some non-limiting embodiments or aspects, raw RF waveform data may be generated by image capture using an imaging device. In this way, raw RF waveform data may need to be pre-processed before it is usable as RF ultrasound image data or as an RF ultrasound image. For example, raw RF waveform data may need to be pre-processed to generate a spectral RF ultrasound image which may be used and received by computing device 100 and/or ML model 104.

At step 302, the method may include assigning a label. In some non-limiting embodiments or aspects, computing device 100 and/or ML model 104 may assign a label to each pixel of image 102 to generate segmented image 106. In some non-limiting embodiments or aspects, the label may include a tissue-type label, a diagnostic label, a prognostic label, a label associated with a diagnostically relevant artefact, and/or the like. For example, the label may include a label associated with an A-line, a label associated with a B-line, a label associated with a healthy pleural line, a label associated with an unhealthy pleural line, a label associated with a healthy region, a label associated with an unhealthy region, a label associated with a background, or any combination thereof. In some non-limiting embodiments or aspects, the label may include a plurality of labels.

In some non-limiting embodiments or aspects, computing device 100 and/or ML model 104 may assign a label to one or more pixels of image 102 to generate segmented image 106. In some non-limiting embodiments or aspects, computing device 100 and/or ML model 104 may assign a label to a group of pixels of image 102 to generate segmented image 106. In some non-limiting embodiments or aspects, each pixel of segmented image 106 may be labeled with more than one label. In some non-limiting embodiments or aspects, the labels which may be assigned to each pixel may include one or more labels associated with an anatomic tissue type, one or more labels associated with a diagnostic artifact type, one or more labels associated with a visual descriptor, or any combination thereof. In some non-limiting embodiments or aspects, the label assigned to each pixel of image 102 to generate segmented image 106 may include a tissue-type label. In some non-limiting embodiments or aspects, the tissue-type label may include a label associated with skin, a label associated with fat, a label associated with fat fascia, a label associated with muscle, a label associated with muscle fascia, a label associated with bone, a label associated with vessels, a label associated with nerves, a label associated with lymphatic structures, a label associated with tumors, or any combination thereof.

At step 304, the method may include classifying an image. For example, computing device 100 and/or ML model 104 may classify segmented image 106. In some non-limiting embodiments or aspects, computing device 100 and/or ML model 104 may classify segmented image 106 into at least one class to generate a classified image. In some non-limiting embodiments or aspects, the classified image may include a classification label indicating a clinical assessment of the portion of the subject. The classification label may include a label associated with a diagnostic and/or prognostic class, a label associated with the indication of a clinical assessment, and/or the like. For example, the classification label may include a label associated with COVID-19, a label associated with pneumonia, a label associated with normal (e.g., a normal assessment, a healthy subject, and/or a healthy portion of a subject), a label associated with a pulmonary disease, or any combination thereof.

In some non-limiting embodiments or aspects, computing device 100 and/or ML model 104 may classify segmented image 106 based on segmented image 106 having labels assigned to each pixel of segmented image 106. In some non-limiting embodiments or aspects, computing device 100 and/or ML model 104 may classify segmented image 106 based on segmented image 106 having labels assigned to one or more pixels of segmented image 106.

In some non-limiting embodiments or aspects, the method may include inputting the image. For example, computing device 100 may input image 102 into ML model 104. In some non-limiting embodiments or aspects, computing device 100 may input image 102 into ML model 104 for training ML model 104. Image 102 may also be input into ML model 104 for producing an output, such as segmented image 106. In some non-limiting embodiments or aspects, computing device 100 may receive image 102 as input from a separate computing device. In some non-limiting embodiments or aspects, image 102 may be input into at least one ML model (e.g., ML model 104, a segmentation ML model, a classification ML model, and/or the like) for training the at least one ML model and/or for producing an inference (e.g., prediction, runtime output, and/or the like). For example, computing device 100 may input image 102 into ML model 104 for the purpose of classifying a segmented image (e.g., segmented image 106). In some non-limiting embodiments or aspects, ML model 104 may segment image 102 and classify segmented image 106 in a single task.

In some non-limiting embodiments or aspects, image 102 may be pre-processed before it is input into computing device 100 and/or ML model 104. For example, a computing device (e.g., computing device 100) may crop and/or pad image 102 to a predetermined image size before inputting image 102 into computing device 100 and/or ML model 104. In some non-limiting embodiments or aspects, computing device 100 and/or ML model 104 may process raw RF waveform data to generate a spectral image including raw RF waveform data (e.g., an RF ultrasound image).

In some non-limiting embodiments or aspects, the method may include determining acoustic frequency values. For example, ML model 104 may determine acoustic frequency values based on image 102, wherein image 102 includes a RF ultrasound image. In some non-limiting embodiments or aspects, computing device 100 and/or ML model 104 may determine acoustic frequency values based on raw RF waveform data. In some non-limiting embodiments or aspects, computing device 100 and/or ML model 104 may determine an acoustic frequency value for each pixel in image 102, such that image 102 may include a plurality of acoustic frequency values, each acoustic frequency value corresponding to a pixel in image 102. In some non-limiting embodiments or aspects, computing device 100 and/or ML model 104 may store the plurality of acoustic frequency values in a storage component by mapping each acoustic frequency value to a pixel in image 102. For example, computing device 100 and/or ML model 104 may assign an identifier (e.g., an integer value) to each pixel in image 102 such that each pixel is assigned a unique identifier (e.g., a unique integer value). Once acoustic frequencies are determined for each pixel, the acoustic frequencies may be stored in a storage component by mapping each acoustic frequency value to the unique identifier (e.g., unique integer value) of the pixel corresponding to the acoustic frequency value. For example, ML model 104 may learn mappings between a pixel value (e.g. pixel identifier), acoustic frequency value, and label (e.g., tissue-type label, diagnostic label, prognostic label, and/or the like).

In some non-limiting embodiments or aspects, the method may include classifying pixels. For example, ML model 104 may classify each pixel of image 102 into at least one class to generate segmented image 106. In some non-limiting embodiments or aspects, ML model 104 may classify one or more pixels of image 102 into at least one class to generate segmented image 106. In some non-limiting embodiments or aspects, ML model 104 may assign a label to one or more pixels of image 102 to generate segmented image 106. In some non-limiting embodiments or aspects, ML model 104 may classify the one or more pixels based on a label assigned to the one or more pixels. In some non-limiting embodiments or aspects, segmented image 106 may include a diagnostically segmented image. For example, segmented image 106 may include one or more pixels which have been assigned a label and classified into a diagnostically relevant class (e.g., diagnostic class, prognostic class, or other class associated with a clinical assessment), thereby producing a diagnostically segmented image. In some non-limiting embodiments or aspects, the one or more pixels (e.g., each pixel of image 102) may include a clinical label indicating a diagnosis of a portion of a subject contained within each pixel of the one or more pixels.

In some non-limiting embodiments or aspects, the clinical labels may be predetermined. In some non-limiting embodiments or aspects, the clinical labels may be associated with clinical assessments. For example, a clinical label may include a diagnostic label, such as a label associated with a benign lesion, a label associated with a malignant lesion, a label associated with background (e.g., background of an image, the label assigned to an indistinguishable image and/or pixel, a non-diagnostically relevant image and/or pixel, and/or the like), or any combination thereof.

In some non-limiting embodiments or aspects, one or more pixels may be classified into at least one class by assigning a clinical label to the one or more pixels and mapping the one or more pixels to an identifier associated with its assigned clinical class. For example, computing device 100 and/or ML model 104 may assign an identifier (e.g., an integer value) to one or more pixels in image 102 such that the one or more pixels are assigned a unique identifier (e.g., a unique integer value). ML model 104 may classify the one or more pixels by assigning a class identifier to an individual pixel of the one or more pixels based on the class represented in the individual pixel (e.g., the portion of the image contained in the individual pixel) to produce a classified pixel. The class identifier may represent a clinical class and may include a unique class identifier (e.g., unique integer, unique character, unique hash, and/or the like). The unique class identifier may be mapped to the unique identifier assigned to the pixel being classified (e.g., classified pixel) to produce a classified pixel mapping. In some non-limiting embodiments or aspects, computing device 100 and/or ML model 104 may store the classified pixels and/or classified pixel mapping in a storage component.

In some non-limiting embodiments or aspects, the method may include generating a segmented image. For example, ML model 104 may generate segmented image 106. In some non-limiting embodiments or aspects, ML model 104 may generate at least one segmented image based on at least one RF ultrasound image and at least one grey ultrasound image. For example, ML model 104 may generate segmented image 106 based on processing image 102, wherein image 102 includes an RF ultrasound image and/or a grey ultrasound image. In some non-limiting embodiments or aspects, processing may include encoding image 102 into encoded image data. In the case where image 102 includes an RF ultrasound image and a grey ultrasound image, ML model 104 may combine encoded RF ultrasound image data and encoded grey ultrasound image data in a bottleneck layer of ML model 104 to concatenate the encoded RF ultrasound image data and encoded grey ultrasound image data to produce concatenated image data. ML model 104 may then decode the concatenated image data to produce a segmented image (e.g., segmented image 106). In some non-limiting embodiments or aspects, ML model 104 may generate segmented image 106 and classify segmented image 106 within a single task (e.g., prediction, inference, runtime output, and/or the like).

In some non-limiting embodiments or aspects, ML model 104 may classify segmented image 106 into at least one class to generate a classified image. In some non-limiting embodiments or aspects, the class may include a diagnostic class, such as a benign class or a malignant class, which may be associated with a classification label. For example, the classification label may include a label associated with COVID-19, a label associated with pneumonia, a label associated with normal, a label associated with a pulmonary disease, or any combination thereof.

In some non-limiting embodiments or aspects, computing device 100 and/or ML model 104 may classify segmented image 106 into at least one class by determining a probability score. In some non-limiting embodiments or aspects, the class may include a diagnostic class of a plurality of diagnostic classes (e.g., a total number of diagnostic classes). The probability score may indicate a likelihood that segmented image 106 contains an image of a portion of a subject belonging to the at least one class, the probability score based on a ratio of an average probability of segmented image 106 across the at least one class to a sum of average probabilities of the segmented image 106 across each diagnostic class of a total of diagnostic classes, given by:

$$CSL(k, I_s) = \frac{\exp(CSS(k, I_s))}{\sum_{m\in A}\exp(CSS(m, I_s))}$$

where k is the at least one diagnostic class, $I_s$ is the segmented image, m is a given diagnostic class, CSS(k, $I_s$) is a cumulative semantic score for the first diagnostic class, CSS(m, $I_s$) is a cumulative semantic score for the second diagnostic class, and A is a subset of segmentation classes. The average probability of segmented image 106 across a diagnostic class is based on a ratio of a sum of average probabilities of each pixel of a total number of pixels across each diagnostic class of the total of diagnostic classes to the total number of pixels in segmented image 106. The average probability across a diagnostic class for each pixel of segmented image 106 may be given by:

$$CSS(m, I_s) = \frac{\sum_{p=1}^{n} I_s(m, p)}{n}$$

where p is a pixel in the segmented image and n is the total number of pixels in the segmented image.

In some non-limiting embodiments or aspects, computing device 100 and/or ML model 104 may assign a classification label indicating a diagnosis of the portion of the subject to segmented image 106 to generate the classified image. In some non-limiting embodiments or aspects, the classification label may be assigned to segmented image 106 based on the probability score. In some non-limiting embodiments or aspects, a diagnostic class may include a malignant tumor, a benign tumor, a class associated with a clinical assessment, and/or the like. In some non-limiting embodiments or aspects, the diagnostic class may be associated with a classification label. For example, the classification label may include a label associated with a malignant lesion, a label associated with a benign lesion, or any combination thereof.

In some non-limiting embodiments or aspects, ML model 104 may classify segmented image 106 into a benign lesion class or a malignant lesion class based on a probability score. In some non-limiting embodiments or aspects, the probability score may indicate a likelihood that segmented image 106 contains an image of the portion of the subject belonging to the malignant lesion class. The probability score may be based on a ratio of an average probability of segmented image 106 across a malignant diagnostic class to a sum of the average probability of segmented image 106 across the malignant diagnostic class and an average probability of segmented image 106 across a benign diagnostic class. The probability score may be given by:

$$P_m(I_s) = \frac{\exp(M(I_s))}{\exp(M(I_s)) + \exp(B(I_s))}$$

where $P_m(I_s)$ is the probability that the segmented image is classified as containing an image of a malignant lesion, $M(I_s)$ is a cumulative semantic score for the malignant lesion class, and $B(I_s)$ is a cumulative semantic score for the benign lesion class.

In some non-limiting embodiments or aspects, the at least one class may include a class based on a type of diagnosis, a type of prognosis, or a class associated with a clinical assessment (e.g., a classification as benign or malignant, as classification as stage-1, stage-2, etc., mild-and-recovering, moderate-and-deteriorating, sever-holding-steady, and/or the like). A class (e.g., the at least one class) can be any suitable class related to a medical image and/or clinical assessment of a medical image in which an image could be predicted to belong based on processing the medical image with computing device 100 and/or ML model 104.

Figure 4:
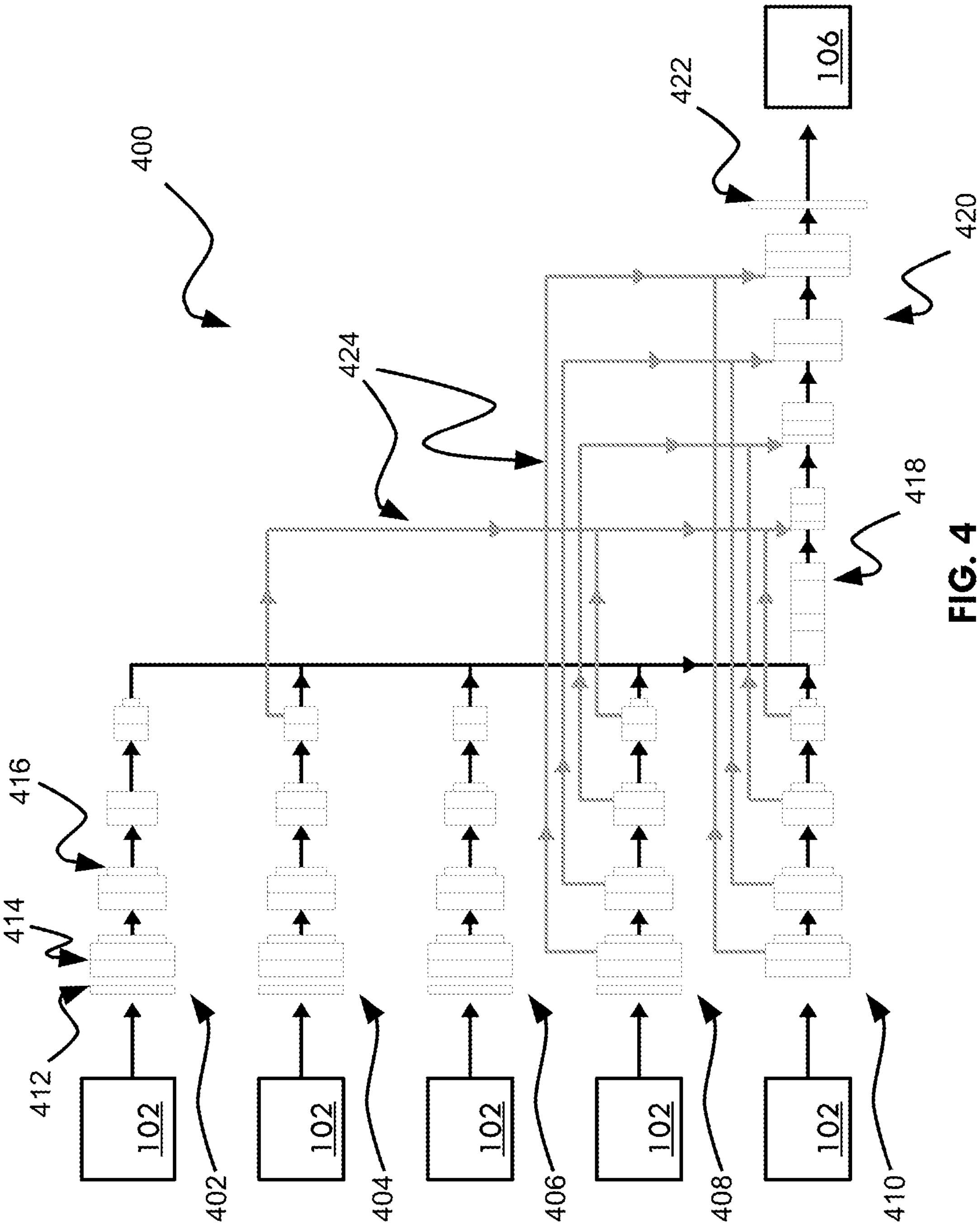
FIG. 4 illustrates a diagram of an example machine-learning model architecture according to non-limiting embodiments.

Referring now to FIG. 4, shown is a diagram of an ML model architecture 400 (e.g., a W-Net architecture) according to non-limiting embodiments. In some non-limiting embodiments or aspects, ML model 104 may include ML model architecture 400. In some non-limiting embodiments or aspects, ML model 104 may be the same as or similar to ML model architecture 400. In some non-limiting embodiments or aspects, ML model architecture 400 may include a W-Net architecture, an AW-Net architecture, a U-Net architecture, an AU-Net architecture, other ML, CNN, and/or DNN model architectures, or any combination thereof.

In some non-limiting embodiments or aspects, ML model architecture 400 may include a plurality of encoding branches to encode RF ultrasound images (e.g., RF encoding branches). In some non-limiting embodiments or aspects, ML model architecture 400 may include a plurality of RF encoding branches. As shown in FIG. 4, ML model architecture 400 may include first RF encoding branch 402, second RF encoding branch 404, third RF encoding branch 406, and fourth RF encoding branch 408. ML model architecture 400 may include any number of RF encoding branches and should not be limited to a total of four RF encoding branches.

In some non-limiting embodiments or aspects, RF encoding branches 402-408 may each include batch normalization layer 412, convolution block 414, and max-pooling layer 416. In some non-limiting embodiments or aspects, RF encoding branches 402-408 may each include a plurality of batch normalization layers 412, a plurality of convolution blocks 414, and/or a plurality of max-pooling layers 416. Each RF encoding branch 402-408 may include similar structures. Alternatively, each RF encoding branch 402-408 in ML model architecture 400 may include different structures from each other. For example, second RF encoding branch 404 and third RF encoding branch 406 are shown in FIG. 4 without max-pooling layers 416 on the final convolution block 414.

In some non-limiting embodiments or aspects, ML model architecture 400 may include at least one grey image encoding branch 410. ML model architecture 400 may include one or more grey image encoding branches 410. In some non-limiting embodiments or aspects, grey image encoding branch 410 may include batch normalization layer 412, convolution blocks 414, and max-pooling layer 416. Grey image encoding branch 410 may include one or more batch normalization layers 412, convolution blocks 414, and max-pooling layers 416.

With continued reference to FIG. 4, ML model architecture 400 may include bottleneck layer 418, decoding branch 420, convolution layer 422, and skip connections 424. In some non-limiting embodiments or aspects, skip connections 424 may be used between any of RF encoding branches 402-408 and decoding branch 420. In some non-limiting embodiments or aspects, skip connection 424 may be used between grey image encoding branch 410 and decoding branch 420. In some non-limiting embodiments or aspects, convolution layer 422 may include a final Softmax® layer which may generate segmentation output.

In some non-limiting embodiments or aspects, RF encoding branches 402-408 may each receive image 102, wherein image 102 includes an RF ultrasound image and a grey ultrasound image. RF encoding branches 402-408 may process image 102 and pass encoded RF ultrasound image data to bottleneck layer 418. Grey image encoding branch 410 may process image 102 and pass encoded grey ultrasound image data to bottleneck layer 418. Bottleneck layer 418 may concatenate the encoded RF ultrasound image data and encoded grey ultrasound image data into segmented image data which may be passed to decoding branch 420 for processing. After passing through convolution layer 422, ML model architecture 400 may generate segmentation image 106 as output.

Figure 5:
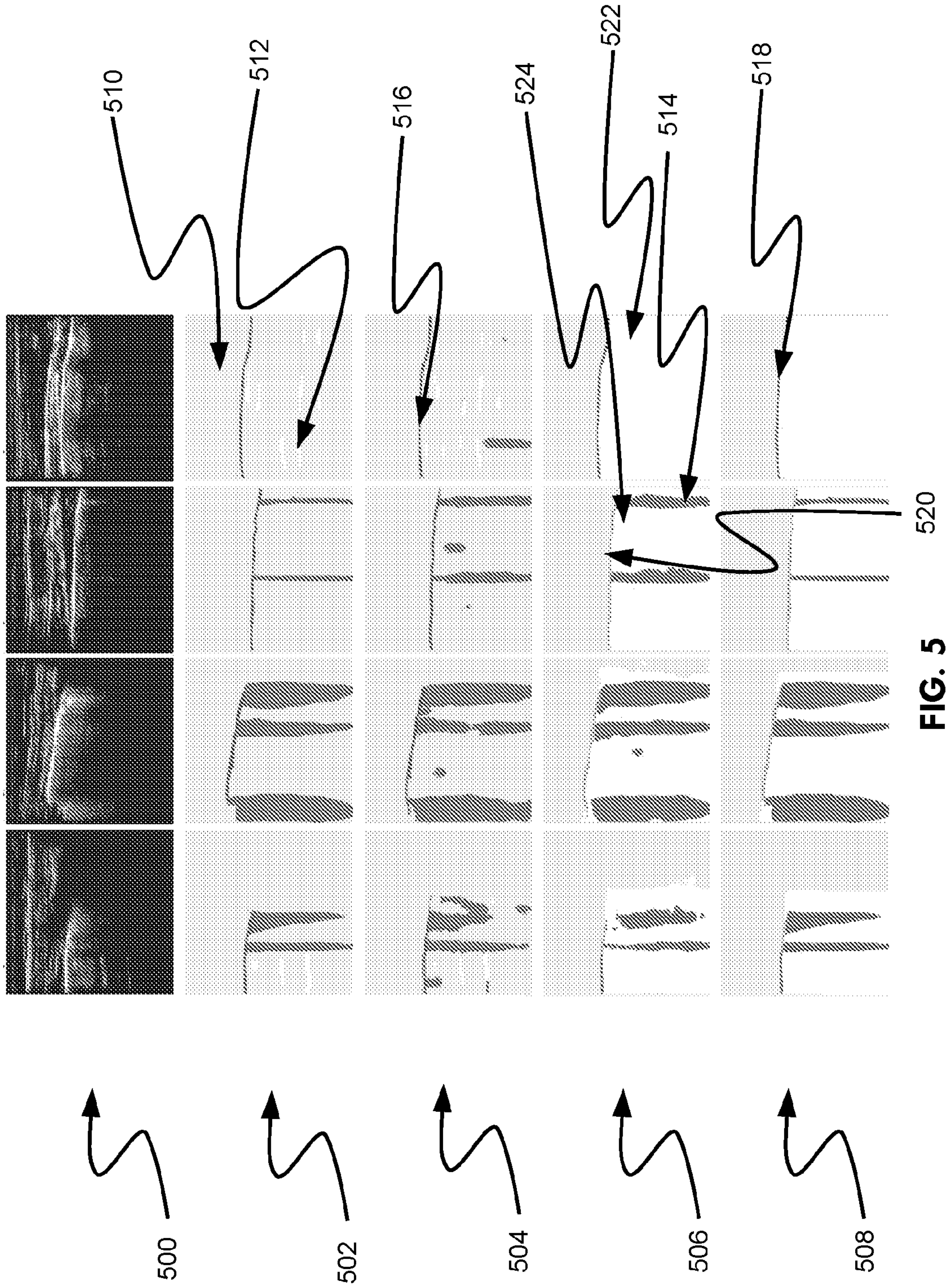
FIG. 5 illustrates example images according to non-limiting embodiments.

Referring now to FIG. 5, shown are example images according to non-limiting embodiments. As shown in FIG. 5, example images may include grey ultrasound images 500, first expert labeled images 502, first ML model labeled images 504, second ML model labeled images 506, and second expert labeled images 508. The labels shown in FIG. 5 may include background 510, A-line 512, B-line 514, pleural line 516, healthy pleural line 518, unhealthy pleural line 520, healthy region 522, and/or unhealthy region 524. Second ML model labeled images 506 were labeled using the systems and methods described herein. As shown in FIG. 5, second ML model labeled images contain fewer false positive results than first ML model labeled images 504.

Figure 6:
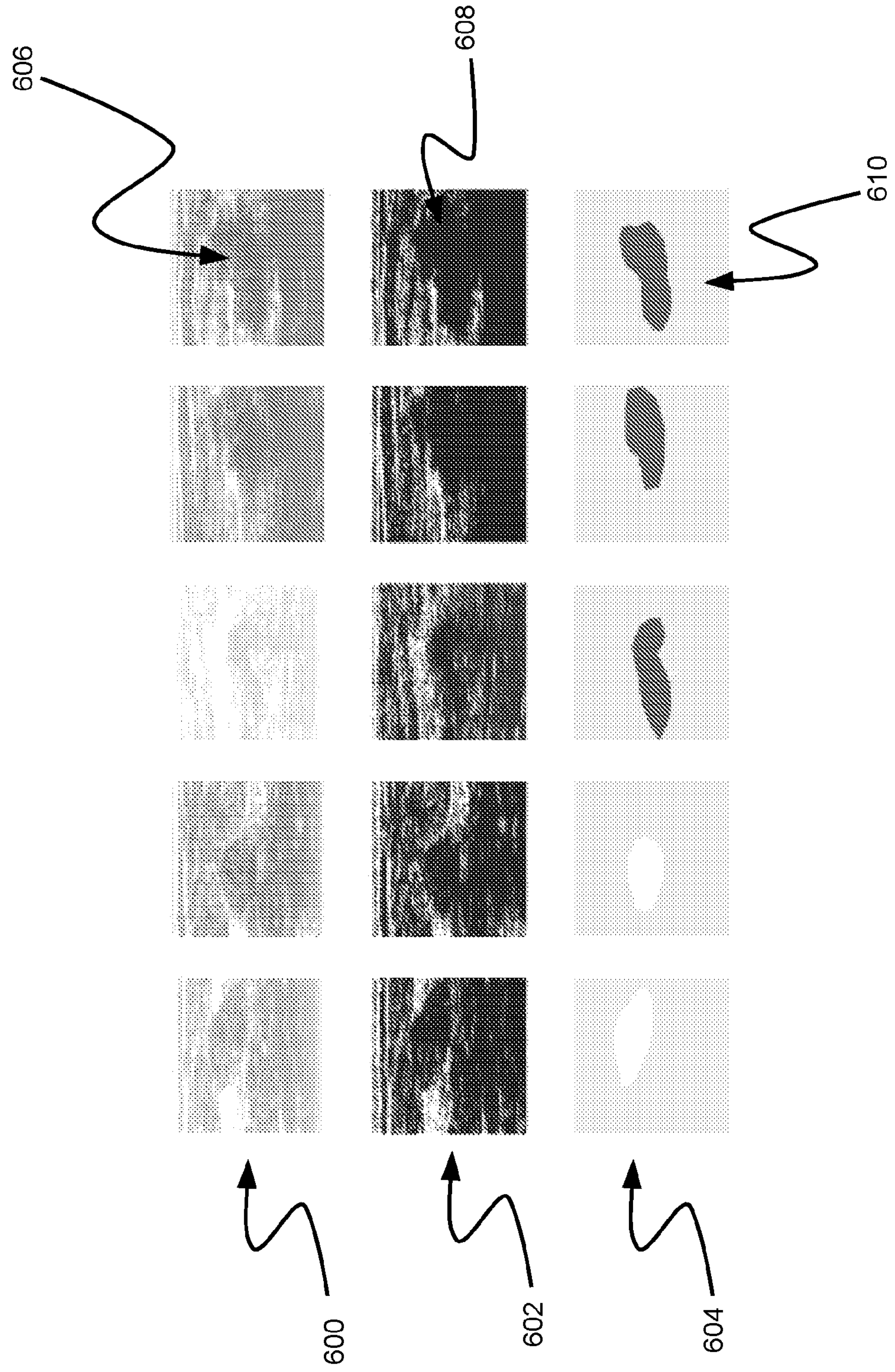
FIG. 6 illustrates example corresponding images including grey ultrasound images, RF ultrasound images, and segmented images according to non-limiting embodiments.

Referring now to FIG. 6, shown are example corresponding images including grey ultrasound images, RF ultrasound images, and segmented images according to non-limiting embodiments. As shown in FIG. 6, example corresponding images may include grey ultrasound images 600, RF ultrasound images 602 (e.g., spectral images showing frequency distribution), segmented images 604, grey ultrasound image 606, RF ultrasound image 608, and segmented image 610. As shown in FIG. 6, grey ultrasound image 606 and RF ultrasound image 608 are corresponding images. In some non-limiting embodiments or aspects, grey ultrasound image 606 and RF ultrasound image 608 may be input into and/or received by computing device 100 and/or ML model 104 for processing. In some non-limiting embodiments or aspects, grey ultrasound image 606 and RF ultrasound image 608 may be processed together by ML model 104 and encoded, concatenated, and decoded by ML model 104 to produce segmented image 610.

Figure 7:
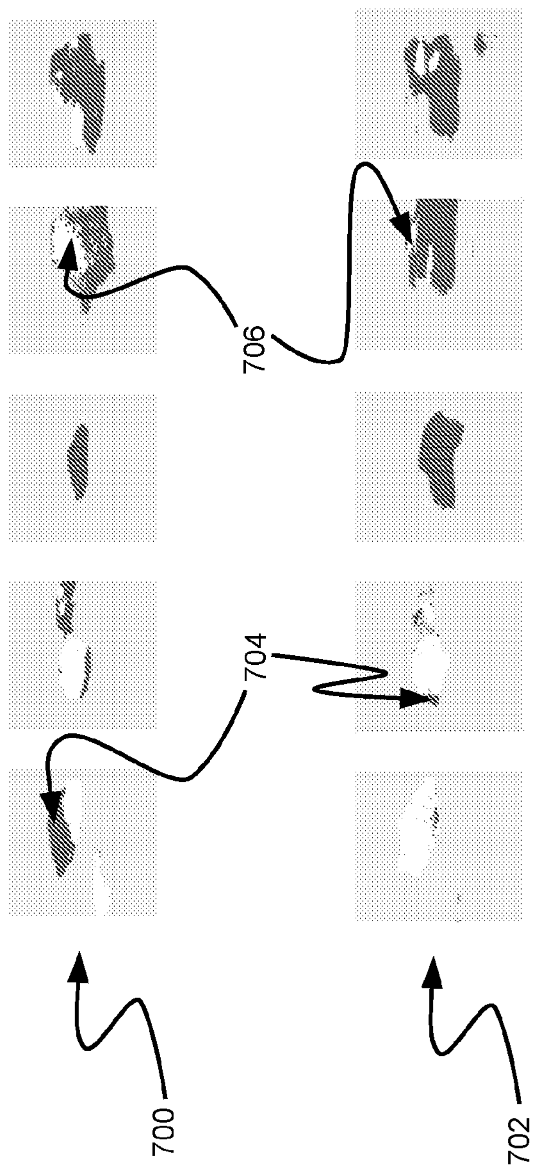
FIG. 7 illustrates example images resulting from direct diagnostic and prognostic semantic segmentation according to non-limiting embodiments.

Referring now to FIG. 7, shown are example images resulting from direct diagnostic and prognostic semantic segmentation according to non-limiting embodiments. As shown in FIG. 7, first segmentation images 700 show example image results generated from a U-Net based machine-learning model. Second segmentation images 702 show example image results generated from a W-Net based machine-learning model. As shown in both first segmentation images 700 and second segmentation images 702, example images generated from an ML model (e.g., ML model 104) may include malignant pixels 704 (e.g., pixels labeled with a diagnostic label of malignant and/or classified into a malignant lesion class). Additionally or alternatively, example images may include benign pixels 706 (e.g., pixels labeled with a diagnostic class of benign and/or classified into a benign lesion class). In some non-limiting embodiments or aspects, example images, such as first segmentation images 700 and second segmentation images 702 may resemble output of ML model 104. In some non-limiting embodiments or aspects, output segmentation images generated by ML model 104 may include different labels and/or classifications, alternative labels and/or classifications, additional labels and/or classifications, or any combination thereof.

Non-limiting embodiments of the systems, methods, and computer program products described herein may be performed in real-time (e.g., as images of a subject are captured during a procedure) or at a later time (e.g., using captured and stored images of a subjecting during the procedure). In non-limiting embodiments, to implement a real-time needle tracking system, multiple processors (e.g., including GPUs) may be used to accelerate the process.

Although embodiments have been described in detail for the purpose of illustration, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A method comprising:

receiving, with at least one computing device, an image of a portion of a subject;

assigning, with the at least one computing device and based on a segmentation machine-learning model, a label to each pixel of the image to generate a segmented image;

generating a classification machine-learning model by training the classification machine-learning model using the segmented image as input;

classifying, with the at least one computing device and based on the classification machine-learning model, the segmented image into at least one diagnostic class of a plurality of diagnostic classes to generate a classified image, wherein the classified image comprises a diagnostic classification label indicating a clinical assessment of the portion of the subject, based on the segmented image having labels assigned to each pixel of the segmented image.

2. The method of claim 1, wherein the image comprises a grey ultrasound image.

3. The method of claim 1, wherein the image comprises a radio frequency (RF) ultrasound image.

4. The method of claim 1, wherein the portion of the subject is a lung region.

5. The method of claim 1, wherein the classification machine-learning model comprises pre-trained weights of the segmentation machine-learning model.

6. The method of claim 1, wherein the image is a sequence of images captured over time.

7. The method of claim 1, wherein each pixel of the segmented image is labeled with one or more labels, the labels comprising:

one or more labels associated with anatomic tissue type, one or more labels associated with diagnostic artifact type, one or more labels associated with a visual descriptor, or any combination thereof.

8. The method of claim 1, wherein the image comprises at least one radio frequency (RF) ultrasound image and at least one grey ultrasound image.

9. The method of claim 1, wherein the segmentation machine-learning model comprises a W-Net architecture, an AW-Net architecture, or any combination thereof.

10. The method of claim 1, wherein the classification machine-learning model comprises a W-Net architecture, an AW-Net architecture, or any combination thereof.

11. A system comprising at least one computing device programmed or configured to:

receive an image of a portion of a subject;

assign, based on a segmentation machine-learning model, a label to each pixel of the image to generate a segmented image;

generate a classification machine-learning model by training the classification machine-learning model using the segmented image as input; and classify, based on the classification machine-learning model, the segmented image into at least one diagnostic class of a plurality of diagnostic classes to generate a classified image, wherein the classified image comprises a diagnostic classification label indicating a clinical assessment of the portion of the subject, based on the segmented image having labels assigned to each pixel of the segmented image.

12. The system of claim 11, wherein the image comprises a grey ultrasound image.

13. The system of claim 11, wherein the image comprises a radio frequency (RF) ultrasound image.

14. The system of claim 11, wherein the portion of the subject is a lung region.

15. The system of claim 11, wherein the classification machine-learning model comprises pre-trained weights of the segmentation machine-learning model.

16. The system of claim 11, wherein the image is a sequence of images captured over time.

17. The system of claim 11, wherein the image comprises at least one radio frequency (RF) ultrasound image and at least one grey ultrasound image.

18. The system of claim 11, wherein the segmentation machine-learning model comprises a W-Net architecture, an AW-Net architecture, or any combination thereof.

19. The system of claim 11, wherein the classification machine-learning model comprises a W-Net architecture, an AW-Net architecture, or any combination thereof.

20. A computer program product comprising at least one non-transitory computer-readable medium including instructions that, when executed by at least one computing device, cause the at least one computing device to:

receive an image of a portion of a subject;

assign, based on a segmentation machine-learning model, a label to each pixel of the image to generate a segmented image;

generate a classification machine-learning model by training the classification machine-learning model using the segmented image as input; and classify, based on the classification machine-learning model, the segmented image into at least one diagnostic class of a plurality if diagnostic classes to generate a classified image, wherein the classified image comprises a diagnostic classification label indicating a clinical assessment of the portion of the subject, based on the segmented image having labels assigned to each pixel of the segmented image.

* * * * *